United States Patent
Mori et al.

(10) Patent No.: US 10,567,832 B2
(45) Date of Patent: Feb. 18, 2020

(54) COMMUNICATION DEVICE, COMMUNICATION CONTROL DATA TRANSMITTING METHOD, AND COMMUNICATION CONTROL DATA RECEIVING METHOD

(71) Applicant: SATURN LICENSING LLC, New York, NY (US)

(72) Inventors: Masahito Mori, Kanagawa (JP); Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 3 days.

(21) Appl. No.: 15/108,718

(22) PCT Filed: Dec. 1, 2014

(86) PCT No.: PCT/JP2014/081712
§ 371 (c)(1),
(2) Date: Jun. 28, 2016

(87) PCT Pub. No.: WO2015/107783
PCT Pub. Date: Jul. 23, 2015

(65) Prior Publication Data
US 2016/0330511 A1 Nov. 10, 2016

(30) Foreign Application Priority Data

Jan. 14, 2014 (JP) .................................. 2014-004115

(51) Int. Cl.
*H04N 21/438* (2011.01)
*H04W 4/06* (2009.01)
(Continued)

(52) U.S. Cl.
CPC ....... *H04N 21/4383* (2013.01); *H04N 21/435* (2013.01); *H04N 21/6181* (2013.01); *H04N 21/6547* (2013.01); *H04W 4/06* (2013.01)

(58) Field of Classification Search
CPC ....................... H04N 21/4383; H04N 21/6547
See application file for complete search history.

(56) References Cited

U.S. PATENT DOCUMENTS 8,019,271 B1* 9/2011 Izdepski ................ H04H 60/73
455/3.01
2009/0150956 A1* 6/2009 Van De Leur ..... H04N 21/2353
725/114
(Continued)

FOREIGN PATENT DOCUMENTS

CN 101605010 A 12/2009
JP 2005-92483 A 4/2005
(Continued)

OTHER PUBLICATIONS

European Office Action dated Dec. 18, 2018 in European Application No. 14 878 864.9, (citing document AX, therein). 7 pages.
(Continued)

*Primary Examiner* — Pankaj Kumar
*Assistant Examiner* — Sahar Aqil Riaz
(74) *Attorney, Agent, or Firm* — Oblon, McClelland, Maier & Neustadt, L.L.P.

(57) ABSTRACT

Transmission frequency information in units of component, the component being a data element contained in one broadcast delivery service and allowed for independent delivery, is supplied to a user terminal to execute reception setting in units of component. A data transmission device transmits, to the user terminal, metadata recording transmission frequency information in units of component that is constituent data of a broadcast delivery service and corresponds to a data element allowed for independent delivery to
(Continued)

the user terminal, such as units of component of image data having a particular resolution, audio data or subtitle data in a particular language, or other types of data. The user terminal corresponding to a receiving device executes a setting process for setting a reception frequency allowing reception of a component to be received based on transmission frequency information recorded in units of component in the metadata received from the data transmission device.

17 Claims, 16 Drawing Sheets

(51) Int. Cl.
   *H04N 21/6547*   (2011.01)
   *H04N 21/435*   (2011.01)
   *H04N 21/61*   (2011.01)

(56) References Cited

U.S. PATENT DOCUMENTS

| | | | |
|---|---|---|---|
| 2009/0313293 | A1 | 12/2009 | Setlur et al. |
| 2010/0013997 | A1* | 1/2010 | Hwang ............... H04N 5/44543 |
| | | | 348/553 |
| 2011/0228716 | A1* | 9/2011 | Xue ................. H04H 20/28 |
| | | | 370/312 |
| 2011/0237202 | A1* | 9/2011 | Uemura ............ H04W 36/0088 |
| | | | 455/67.14 |
| 2011/0302270 | A1* | 12/2011 | Kawabe .............. H04L 12/1845 |
| | | | 709/217 |
| 2012/0284421 | A1* | 11/2012 | Xiao ................. H04N 5/45 |
| | | | 709/231 |
| 2013/0039232 | A1* | 2/2013 | Kim .................. H04L 5/14 |
| | | | 370/280 |
| 2013/0044670 | A1 | 2/2013 | Jang et al. |
| 2013/0044708 | A1 | 2/2013 | Kim et al. |
| 2014/0095668 | A1* | 4/2014 | Oyman ............. H04W 52/0258 |
| | | | 709/219 |
| 2014/0372570 | A1* | 12/2014 | Gupta .................... H04L 67/06 |
| | | | 709/219 |
| 2015/0089020 | A1* | 3/2015 | Altman .............. H04N 21/2547 |
| | | | 709/217 |
| 2015/0215897 | A1 | 7/2015 | Jang et al. |

FOREIGN PATENT DOCUMENTS

| | | |
|---|---|---|
| JP | 2009-201051 A | 9/2009 |
| JP | 2011-254391 A | 12/2011 |
| JP | 2012-49959 A | 3/2012 |
| JP | 2013-85086 A | 5/2013 |
| RU | 2 443 078 C2 | 2/2012 |
| RU | 2 502 222 C2 | 12/2013 |
| WO | WO 2010/032675 A1 | 3/2010 |
| WO | WO 2013/025038 A2 | 2/2013 |
| WO | WO 2013/053448 A1 | 4/2013 |
| WO | WO 2013/186663 A1 | 12/2013 |

OTHER PUBLICATIONS

Qualcomm Incorporated etal: "USD Indication of DASH Transport", 3GPP Draft; 26346_CRO320R8_(REL-12)_S4-131403, 3$^{rd}$ . . . , 3GPP TSG-SA4 Meeting #76, Osaka, Japan Nov. 4-8, 2013, 17 pages.

International Search Report dated Feb. 17, 2015 in PCT/JP2014/081712.

"USD Schema Correction for OMA Push Usage for MBMS Download" Huawei Technologies, HiSilicon Technologies, 3GPP TSG-WG4 Meeting #75 S4-131138, Sep. 27, 2013, 7 Pages.

Extended European Search Report dated May 23, 2017 in Patent Application No. 14878864.9.

3GPP TR 26.848 V0.6.0 (Nov. 2013), "3rd Generation Partnership Project; Technical Specification Group Services and System Aspects; Multimedia Broadcast/Multicast Service (MBMS); Enhanced MBMS Operation (Release 12)", 3GPP Draft, XP50767129, Nov. 8, 2013, 33 pages.

* cited by examiner

COMMUNICATION DEVICE, COMMUNICATION CONTROL DATA TRANSMITTING METHOD, AND COMMUNICATION CONTROL DATA RECEIVING METHOD

TECHNICAL FIELD

The present disclosure relates to a communication device, a communication control data transmitting method, and a communication control data receiving method. More specifically, the present disclosure relates to a communication device, a communication control data transmitting method, and a communication control data receiving method realizing secure reception of delivery data by each user terminal in a broadcast communication process for achieving simultaneous delivery of various types of data, for example.

BACKGROUND ART

Long Term Evolution (LTE) is a wireless access system under standards of a mobile communication system created by an international standardizing body of Third Generation Partnership Project (3GPP).

LTE is a communication system selectable between two types of communication system of Frequency Division Duplex (FDD) and Time Division Duplex (TDD). FDD is a communication system which individually sets a frequency band for exclusive use of uplink corresponding to communication from a user terminal (UE: User Equipment) to a base station of LTE (eNodeB: evolved Node B), and a frequency band for exclusive use of downlink corresponding to communication from the base station to the user terminal (UE). TDD is a system which provides communication from the user terminal to the base station and communication from the base station to the user terminal on time division basis. A conventional technology of a communication system using LTE is disclosed in Patent Document 1 (Japanese Patent Application Laid-Open No. 2013-85086), for example.

One of characteristic functions performed by LTE is Multimedia Broadcast Multicast Service (MBMS).

MBMS is a broadcast type delivery service which simultaneously delivers identical data, such as movie content, to a plurality of user terminals (UEs) located within a particular area by using a common bearer. Broadcast delivery using MBMS allows simultaneous supply of identical content to user terminals such as numerous smartphones located in a delivery service supply area.

CITATION LIST

Patent Document

Patent Document 1: Japanese Patent Application Laid-Open No. 2013-85086

SUMMARY OF THE INVENTION

Problems to be Solved by the Invention

There is a system called evolved Multimedia Broadcast Multicast Service (eMBMS) capable of effectively realizing a broadcast type delivery service, i.e., MBMS mentioned above, by using LTE.

Currently, 3GPP has been creating specific specifications of eMBMS. According to the current specifications, a user terminal (UE) is notified about a frequency band and a delivery area in units of one service such as one program.

However, a user terminal (UE) is not notified about a transmission frequency band for each of a plurality of delivery data elements (components) contained in one service.

For example, when a service presented by using eMBMS is a movie content supply service, examples of components as data elements delivered by this service include images, Japanese voices, English voices, Korean voices, and the like.

The current specifications of 3GPP do not specify processing performed for notifying a user terminal (UE) about a transmission frequency band for each of components including the foregoing types of components.

Accordingly, a user terminal is difficult to recognize frequencies of respective components when one service contains a mixture of components transmitted at different frequencies. In this case, setting necessary for receiving the respective components may become difficult to execute. When Japanese voices and Korean voices are transmitted at different transmission frequencies, for example, only either one of the two types of voices may be receivable.

The present disclosure has been developed to solve the aforementioned problems. It is an object of the present disclosure to provide a communication device, a communication control data transmitting method, and a communication control data receiving method capable of notifying a user terminal (UE) about a frequency band and a service supply area in units of component corresponding to a constituent element of one service to realize secure reception of components available for the user terminal.

Solutions to Problems

A first aspect of the present disclosure is directed to a communication device including:

a data processing unit that generates, or acquires from a storage unit, metadata recording transmission frequency information in units of component that is constituent data of a broadcast delivery service and corresponds to a data element allowed for independent delivery to a user terminal; and a communication unit that transmits the metadata to the user terminal.

According to the communication device of the present disclosure in one mode, the component is a data element contained in one broadcast delivery service and allowed for independent delivery, and the metadata is a structure that records transmission frequency information corresponding to each of all components contained in one broadcast delivery service.

According to the communication device of the present disclosure in one mode, the data processing unit transmits metadata that records access information in units of component, and transmission area information in units of component, in addition to the transmission frequency information in units of component, to the user terminal via the communication unit.

According to the communication device of the present disclosure in one mode, the data processing unit performs communication control for transmitting, at a different transmission frequency, a component that is a data element contained in one broadcast delivery service and allowed for independent delivery, and the metadata records the different transmission frequency as component transmission frequency information.

According to the communication device of the present disclosure in one mode, the communication device includes a storage unit that stores the metadata. The data processing unit reads the metadata from the storage unit, and transmits the metadata to the user terminal via the communication unit in response to a request from the user terminal.

According to the communication device of the present disclosure in one mode, the data processing unit performs communication control for transmitting a particular component only to a particular area at a transmission frequency corresponding to the component via a base station selected in units of component.

According to the communication device of the present disclosure in one mode, the data processing unit executes a broadcast delivery service of content including at least any one of image data, audio data, and subtitle data, and the component is any one of image data, audio data in a particular language, and subtitle data in a particular language, each type of the data corresponding to a data element constituting the broadcast delivery service of the content.

According to the communication device of the present disclosure in one mode, the component includes different sets of encoded image data for realizing image reproduction of different resolutions.

A second aspect of the present disclosure is directed to a communication device including:

a communication unit that receives, from a data transmission device, metadata recording transmission frequency information in units of component that is constituent data of a broadcast delivery service and corresponds to a data element allowed for independent delivery to a user terminal; and a data processing unit that executes a process using the metadata.

According to the communication device of the present disclosure in one mode, the data processing unit executes setting of a reception frequency allowing reception of a component based on transmission frequency information recorded in the metadata in units of component.

According to the communication device of the present disclosure in one mode, the component is a data element contained in one broadcast delivery service and allowed for independent delivery, and the metadata is a structure that records transmission frequency information corresponding to each of all components contained in one broadcast delivery service.

According to the communication device of the present disclosure in one mode, the communication unit receives metadata that records access information in units of component, and transmission area information in units of component, in addition to the transmission frequency information in units of component, from the data transmission device.

According to the communication device of the present disclosure in one mode, the data processing unit executes setting of reception frequencies allowing reception of a plurality of components based on different sets of transmission frequency information recorded in the metadata and indicating transmission frequencies of the plurality of components, and performs communication control for receiving, at a different transmission frequency, a component that is a data element contained in one broadcast delivery service and allowed for independent delivery.

According to the communication device of the present disclosure in one mode, the communication unit executes a reception process for receiving a component transmitted at a transmission frequency corresponding to the component via a base station selected in units of component.

According to the communication device of the present disclosure in one mode, the component is any one of image data, audio data in a particular language, and subtitle data in a particular language, each type of the data corresponding to a data element constituting a broadcast delivery service of content.

According to the communication device of the present disclosure in one mode, the component includes different sets of encoded image data for realizing image reproduction of different resolutions.

A third aspect of the present disclosure is directed to a communication control data transmitting method performed by a data transmission device, the method including:

by a data processing unit, generating, or acquiring from a storage unit, metadata recording transmission frequency information in units of component that is constituent data of a broadcast delivery service and corresponds to a data element allowed for independent delivery to a user terminal; and by a communication unit, transmitting the metadata to the user terminal.

A fourth aspect of the present disclosure is directed to a communication control data receiving method performed by a data reception device, the method including:

by a communication unit, receiving, from a data transmission device, metadata recording transmission frequency information in units of component that is constituent data of a broadcast delivery service and corresponds to a data element allowed for independent delivery to a user terminal; and by a data processing unit, executing a process using the metadata.

Other objects, features, and advantages of the present disclosure will become apparent by further detailed description based on an embodiment of the present disclosure and the accompanying drawings described and depicted below. The system in the present specification refers to a logical collective configuration constituted by a plurality of devices, and includes a set of constituent devices not contained in an identical housing.

Effects of the Invention

According to a structure of an embodiment of the present disclosure, transmission frequency information in units of component, the component being a data element contained in one broadcast delivery service is supplied to a user terminal.

In this case, the user terminal is capable of executing reception setting corresponding to a component. Accordingly, a structure capable of securely receiving each component is realizable.

More specifically, a data transmission device transmits metadata to the user terminal, which metadata records transmission frequency information in units of component that is constituent data of a broadcast delivery service and corresponds to a data element allowed for independent delivery to the user terminal, such as units of component constituted by image data having a particular resolution, audio data or subtitle data in a particular language, or other types of data. The user terminal corresponding to a receiving device executes a setting process for setting a reception frequency allowing reception of a component intended to be received based on transmission frequency information recorded in units of component in the metadata received from the data transmission device.

According to this structure, transmission frequency information in units of component, the component being a data element contained in one broadcast delivery service, is supplied to the user terminal. In this case, the user terminal is capable of executing reception setting corresponding to a component. Accordingly, a structure capable of securely receiving each component is realizable.

Advantageous effects described in this specification are presented only by way of example, wherefore other advantageous effects or additional advantageous effects may be offered.

MODE FOR CARRYING OUT THE INVENTION

A communication device, a communication control data transmitting method, and a communication control data receiving method are hereinafter described in detail with reference to the drawings. The description is presented based on the following items.

1. Configuration Example of Communication System
2. Example of Process with Metadata Available by User Terminal under Current Specifications
3. Process Example of Present Disclosure for Notification about Transmission Frequency per Component
4. Configuration and Process of Communication Device
5. Hardware Configuration Example of Devices
6. Summary of Present Disclosure

[1. Configuration Example of Communication System]

Figure 1:
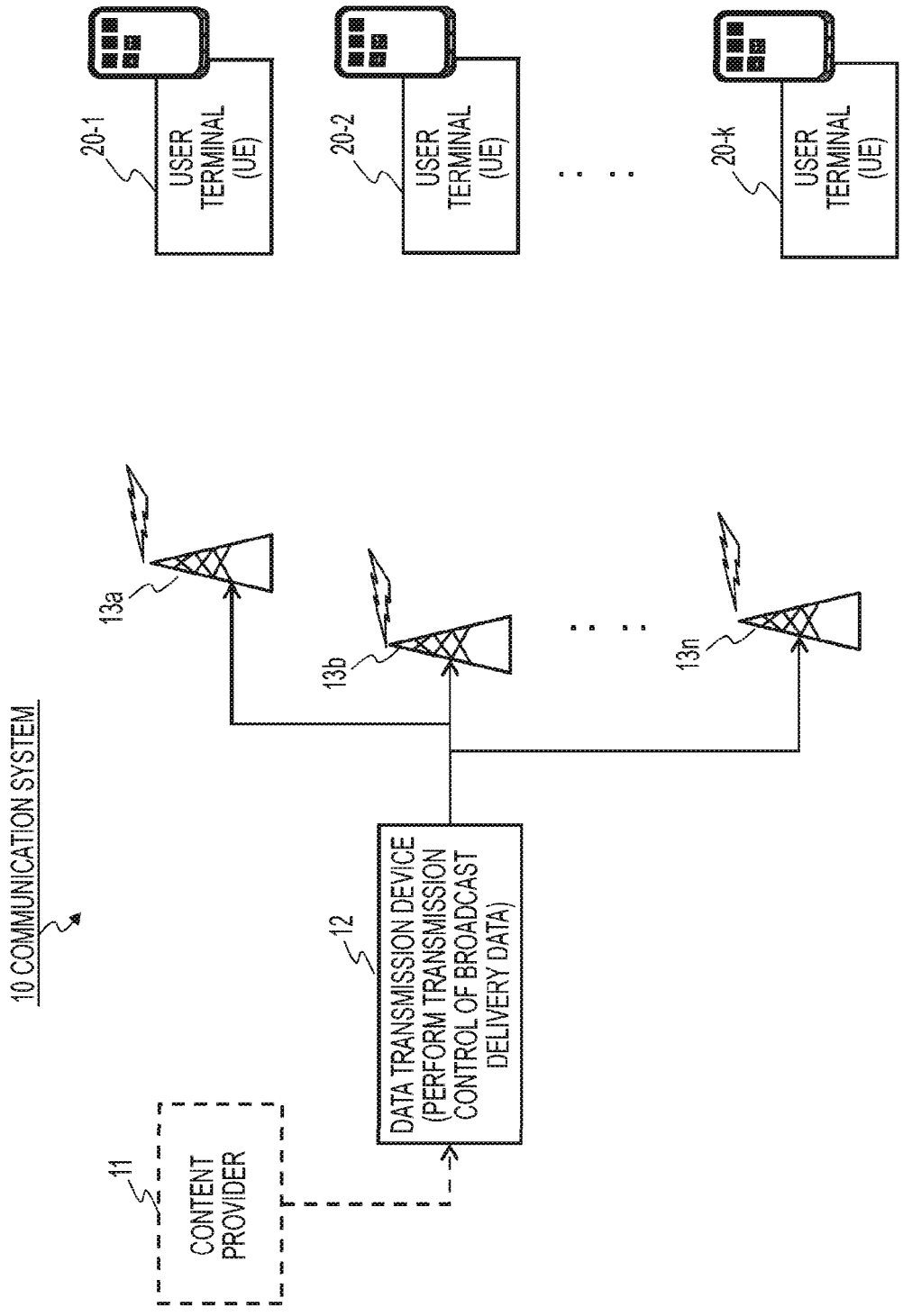
FIG. 1 is a view illustrating a configuration example of a communication system which executes processing according to the present disclosure.

Discussed hereinbelow with reference to FIG. 1 is a configuration example of a communication system which executes processing of the present disclosure.

As illustrated in FIG. 1, a communication system 10 includes a data transmission device 12 functioning as a communication device for transmitting content such as image data and audio data, and user terminals 20-1 through 20-$k$ functioning as communication devices for receiving transmission content from the data transmission device 12.

Communication between the data transmission device 12 and the user terminals 20 is achieved via base stations 13.

For example, the data transmission device 12 transmits content such as a movie supplied from a content provider 11 to the user terminals 20 via the plurality of base stations 13.

The communication system 10 illustrated in FIG. 1 executes a communication process by using LTE (Long Term Evolution) corresponding to a wireless access system in a mobile communication system.

As described above, LTE is a wireless access system in a mobile communication system in conformity with standards created by an international standardizing body of Third Generation Partnership Project (3GPP).

The data transmission device 12 of the communication system 10 illustrated in FIG. 1 simultaneously transmits common data, such as movie content, to the plurality of user terminals (UEs) 20-1 through 20-$k$ located within a particular area via the plurality of LTE base stations (eNodeB: evolved Node B) 13$a$ through 13$n$.

More specifically, the data transmission device 12 performs broadcast delivery of data by using evolved Multimedia Broadcast Multicast Service (eMBMS).

Each of the user terminals 20-1 through 20-$k$ is a portable terminal such as a smartphone.

The data transmission device 12 stores content supplied from the content provider 11, such as movie content, in packets, and performs a broadcast delivery process under eMBMS.

As described above, 3GPP has been creating specific specifications of eMBMS at present.

When content supplied from the content provider 11 is movie content, for example, this movie content contains various different types of element data (components), such as images, Japanese voices, English voices, and Japanese subtitles.

In the following description, each of data streams constituted by different types of element data allowed for independent delivery is referred to as a "component".

A collective package of components corresponding to a broadcast delivery service target, such as program content constituted by one or more components, and content supplied by Video onDemand (VoD) or the like is referred to as a "service".

Accordingly, a component is a data element contained in one broadcast delivery service and allowed for independent delivery.

The data transmission device 12 stores data, such as images, Japanese voices, and English voices, in a storage unit in units of component. The user terminal is capable of acquiring data in units of component based on data access, such as URI and other access information specified in units of component. Accordingly, a component is a unit of data to which the user terminal is individually accessible.

The user terminal initially determines a "service" such as a desired movie, and then selects a component contained in the service, receives the component, and reproduces the received component.

A service corresponds to one movie content, for example. One "service" contains a plurality of components corresponding to streams allowed for independent delivery.

For example, one of the following components is contained in one service corresponding to one movie content.
 (a) First component: image data
 (b) Second component: Japanese audio data
 (c) Third component: English audio data
 (d) Fourth component: Korean audio data
 (e) Fifth component: Japanese subtitle data
 (f) Sixth component: English subtitle data
 (g) Seventh component: Korean subtitle data These components are individually stored in the data delivery device 12, or other data delivery servers. Each of the user terminals 20 is capable of accessing and acquiring each of the components. Accordingly, each of the components is data allowed to be delivered to the user terminals as an individual stream.

The image data presented as the first component in (a) is dividable into sets of data separately delivered as sets of image data having a plurality of different resolutions, such as HD image data and 4K image data. In this case, the plurality of sets of image data may be determined as different components, and supplied to the user terminals as individual streams.

In addition, transmission images may be divided into base layer images allowing only low-resolution image reproduction, and enhancement layer images added to base layer images for high-resolution image reproduction. In this case, the respective types of the layer images may be supplied to the user terminals as individual streams. According to this setting, base layer image data and enhancement layer images are determined as different components.

For example, (a) image data and (b) Japanese audio data described above may be delivered as one data stream. In this case, (a) image data and (b) Japanese audio data are defined as one component.

According to this setting, the user terminals 20 execute a process for separating the image data and audio data from the received stream for reproduction.

The foregoing component setting examples are presented only by way of example. Various types of component settings are applicable for respective services.

Figure 2:
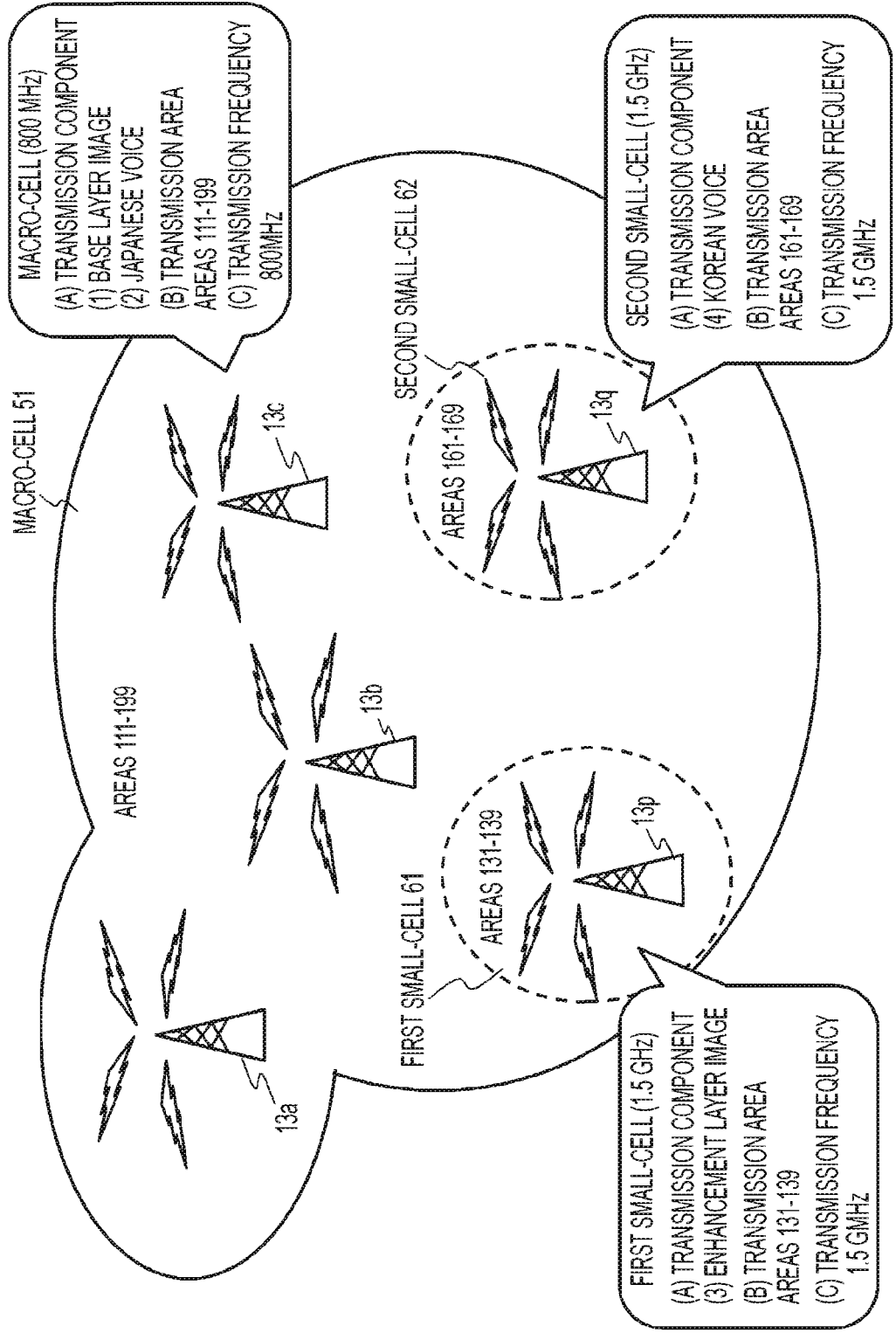
FIG. 2 is a view illustrating an example of a component transmission process performed for a macro-cell containing small-cells.

Discussed hereinbelow with reference to FIG. 2 is an example of a service supply process performed for supplying a service containing a plurality of components to the user terminals.

Data storage packets output from the data transmission device 12 illustrated in FIG. 1 are transmitted to the user terminals 20 via the base stations 13 provided at a plurality of different positions.

The data transmission device 12 is capable of determining an output frequency for data transmission, and selecting and setting a base station for data transmission, both for each component.

A data transmission range defined for each of the base stations 13 is referred to as a cell. FIG. 2 illustrates five base stations 13a, 13b, 13c, 13p, and 13q. The respective base stations illustrated in the figure are typical base stations presented only as samples. In actual situations, a number of base stations, such as several tens to several hundreds, are provided within a macro-cell 51 illustrated in FIG. 2, for example.

The macro-cell 51 illustrated in FIG. 2 is a collection of plural cells constituted by a plurality of base stations. A collection of cells constituted by a part of the base stations contained in the macro-cell 51 is referred to as a small-cell.

According to the example illustrated in FIG. 2, a collection of cells defined by the base station 13p and others is a first small-cell 61, while a collection of cells defined by the base station 13q and others is a second small-cell 62.

Each of the macro-cell and the small-cell corresponds to a delivery area of a particular component. These distribution areas are specified in a list of identifiers of cells associated with respective base stations, for example.

More specifically, the macro-cell 51 illustrated in the figure corresponds to areas 111 through 199. The first small-cell 61 corresponds to areas 131 through 139. The second small-cell 62 corresponds to areas 161 through 169. This area information (area numbers) corresponds to a list of identifiers of base stations, or cells associated with base stations.

The data transmission device 12 transmits the following two components while determining the base stations located within the macro-cell 51 as data output base stations.
 (1) Base layer image data
 (2) Japanese audio data Image data is constituted by base layer images and enhancement layer images. In this case, low-resolution image reproduction is allowed in case of reproduction of only base layer images. High-resolution and high-image-quality reproduction is allowed in case of reproduction of base layer images and enhancement layer images in combination with each other.

The data transmission device 12 delivers two components of (1) base layer image data, and (2) Japanese audio data at a transmission frequency of 800 MHz via the base stations located in the macro-cell 51 (areas 111 through 199). The macro-cell 51 contains the two small-cells 61 and 62. The foregoing two components are transmitted from all of the base stations 13a, 13b, 13c, 13p, and 13q illustrated in the figure.

More specifically, the data transmission device 12 executes data transmission control under the following settings while determining the macro-cell 51 as a data delivery area.
 (A) Transmission component
 (1) Base layer image data
 (2) Japanese audio data
 (B) Transmission area: macro-cell 51 (areas 111 through 199)
 (C) Transmission frequency: 800 MHz The user terminals located in the macro-cell 51 are capable of receiving and reproducing data streams containing the two components of (1) base layer image data and (2) Japanese audio data.

Furthermore, the data transmission device 12 transmits the following one component while determining the base stations located in the small-cell 61 (areas 131 through 139) as data output base stations.
 (3) Enhancement layer image data As described above, enhancement layer images reproduced in combination with base layer images form high-resolution and high-image-quality reproduction images.

The data transmission device 12 delivers the one component via the base stations located in the small-cell 61 (such as base station 13p) at a transmission frequency of 1.5 GHz.

Accordingly, the data transmission device 12 executes data transmission control based on the following settings while determining the small-cell 61 as a data delivery area.

(A) Transmission component (3) Enhancement layer image data (B) Transmission area: small-cell 61 (areas 131 through 139)

(C) Transmission frequency: 1.5 GHz

The small-cell 61 is contained in the macro-cell 51, wherefore the user terminals within the small-cell 61 are capable of receiving and reproducing (3) enhancement layer image data, in addition to the two components of (1) base layer image data and (2) Japanese audio data. More specifically, the user terminals located within the small-cell 61 are capable of performing an image reproduction process combining base layer image data and enhancement layer image data, and therefore are capable of reproducing image data having higher image quality than the image quality reproduced by the user terminals located in the macro-cell 51 in areas other than the small-cell 61.

The transmission frequency of (1) base layer image data and (2) Japanese audio data is 800 MHz, while the transmission frequency of (3) enhancement layer image data is 1.5 GHz. Accordingly, the user terminals are required to execute such reception setting which allows reception of transmission data at two different transmission frequencies when reception of all of these data (1), (2), and (3) is desired.

Furthermore, the data transmission device 12 transmits the following one component while determining the base stations located in the small-cell 62 (areas 161 through 169) as data output base stations.

(4) Korean audio data

The data transmission device 12 delivers the one component via the base stations (base station 13q and others) located within the small-cell 62 at a transmission frequency of 1.5 GHz.

More specifically, the data transmission device 12 executes data transmission control under the following settings while determining the small-cell 62 as a data delivery area.

(A) Transmission component (4) Korean audio data (B) Transmission area: small-cell 62 (areas 161 through 169)

(C) Transmission frequency: 1.5 GHz

The small-cell 62 is contained in the macro-cell 51, wherefore the user terminals within the small-cell 62 are capable of receiving and reproducing (4) Korean audio data, in addition to the two components of (1) base layer image data and (2) Japanese audio data.

The transmission frequency of (1) base layer image data and (2) Japanese audio data is 800 MHz, while the transmission frequency of (4) Korean audio data is 1.5 GHz. Accordingly, the user terminals are required to execute such reception setting which allows reception of transmission data at two different transmission frequencies when reception of all of these data (1), (2), and (4), or reception of both the data (1) and (4) is desired.

[2. Example of Process with Metadata Available by User Terminal under Current Specifications]

As described with reference to FIGS. 1 and 2, the data transmission device 12 performs data transmission control for transmitting a particular component via a particular base station at a particular frequency.

Under this data transmission control, a particular component is allowed to be supplied only to the user terminal located within a particular limited area.

The process described with reference to FIG. 2 is performable under evolved Multimedia Broadcast Multicast Service (eMBMS), a system effectively realizing MBMS corresponding to a broadcast type delivery service by using LTE. As described above, 3GPP has been creating specific specifications of eMBMS at present. However, according to the current specifications, a user terminal (UE) is notified about a frequency band and a delivery area in units of one service, such as one program.

In this case, a user terminal (UE) is not notified about a transmission frequency band for each of plural components contained in one service, such as images, Japanese voices, English voices, and Korean voices corresponding to elements constituting movie content, for example. Accordingly, when each component has a different transmission frequency, i.e., each voice type of Japanese voices and Korean voices has a different frequency, for example, only either one of these voice types is receivable.

This problem is hereinafter detailed.

Figure 3:
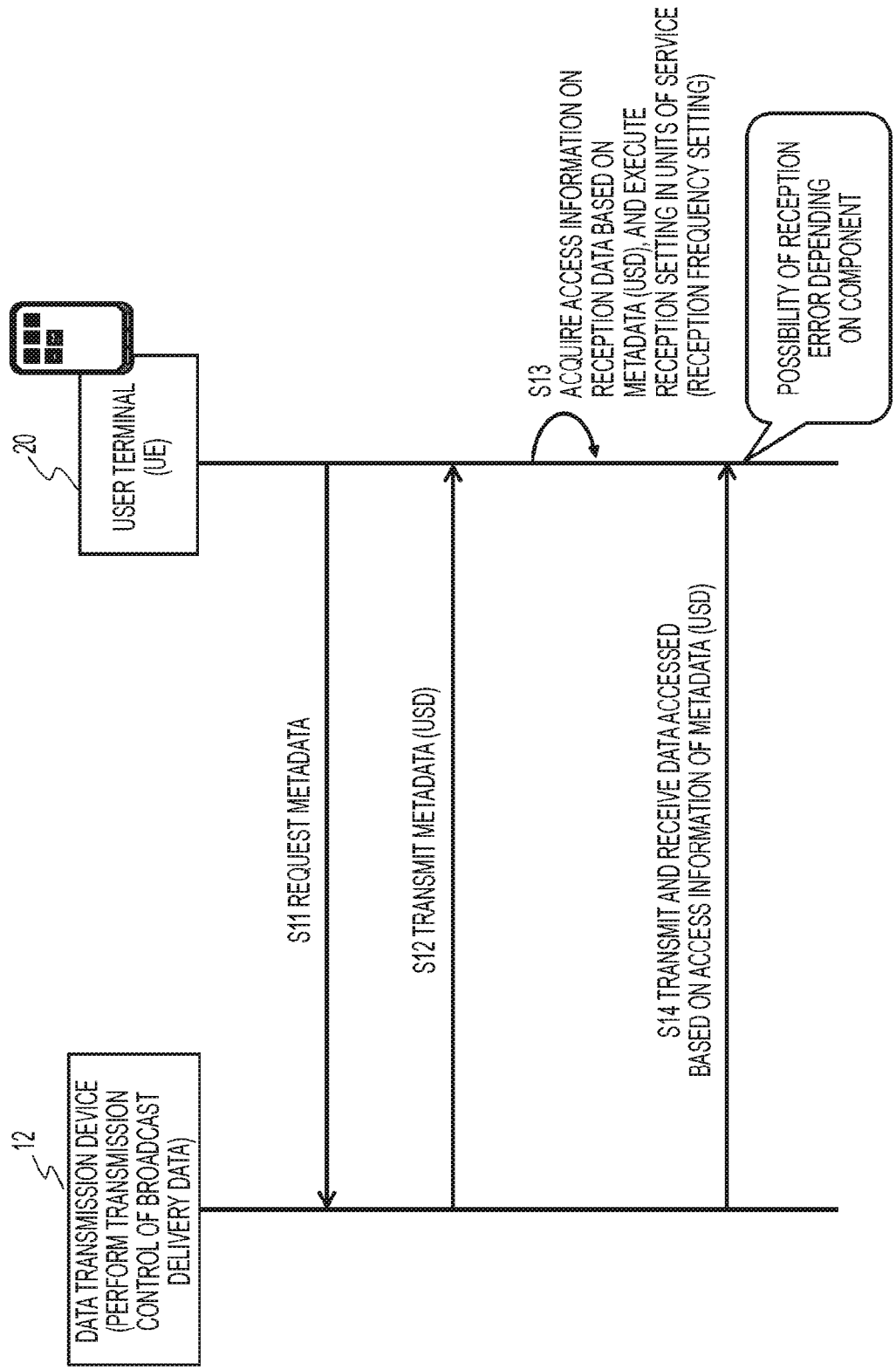
FIG. 3 is a view illustrating an example of a communication sequence between a data transmission device and a user terminal.

Discussed hereinbelow with reference to FIG. 3 is an outline of a process sequence performed for data broadcast delivery under specifications (3GPP TS26.346V12.00) which defines a data delivery standard according to eMBMS and is disclosed in December, 2013, by 3GPP.

FIG. 3 illustrates a communication sequence executed for communication of various types of components between the data transmission device 12 performing the broadcast delivery process via selected base stations, and the user terminal 20 receiving the broadcast delivery data transmitted from the data transmission device 12.

As described with reference to FIG. 1, communication between the data transmission device 12 and the user terminal is achieved via the base station 13. However, the sequence chart in FIG. 3 does not show the base station 13.

It is assumed that the user terminal 20 has already received, from the data transmission device 12, service information available from the data transmission device 12, such as a program list or other types of content list available from the data transmission device 12. The sequence illustrated in FIG. 3 is a sequence performed after a user operating the user terminal 20 inputs selection of a particular service (content such as program) from the received content list. Processes executed in respective steps in FIG. 3 are hereinafter sequentially described.

(Step S11).

The user terminal 20 requests the data transmission device 12 to transmit metadata corresponding to a service input from the user based on corresponding service selection information (such as selection information on program or movie title).

Metadata corresponding to services supplied from the data transmission device 12 is stored in the storage unit of the data transmission device 12. The data transmission device 12 supplies requested metadata to the user terminal 20 in response to the request received from the user terminal 20.

(Step S12)

In response to the request from the user terminal 20 requesting metadata corresponding to the service selected by the user, the data transmission device 12 transmits metadata corresponding to the selected service to the user terminal 20.

This metadata is XML data called User Service Description (USD).

According to the sequence chart illustrated in FIG. 3, the data transmission device 12 performs the supply process for supplying metadata to the user terminal 20 in response to a metadata request from the user terminal in units of service. However, the manner of metadata supply is not limited to this process on the basis of a request from the user terminal in units of service.

For example, metadata on respective services may be contained in a content list corresponding to a list of a plurality of services, such as a program list, and supplied to the user terminal 20 beforehand. In this case, the user terminal is allowed to browse metadata corresponding to a particular program (service) while selecting the program from the program list.

An example of USD constituting metadata supplied to the user terminal 20 is hereinafter described with reference to FIGS. 4 and 5.

Figure 4:
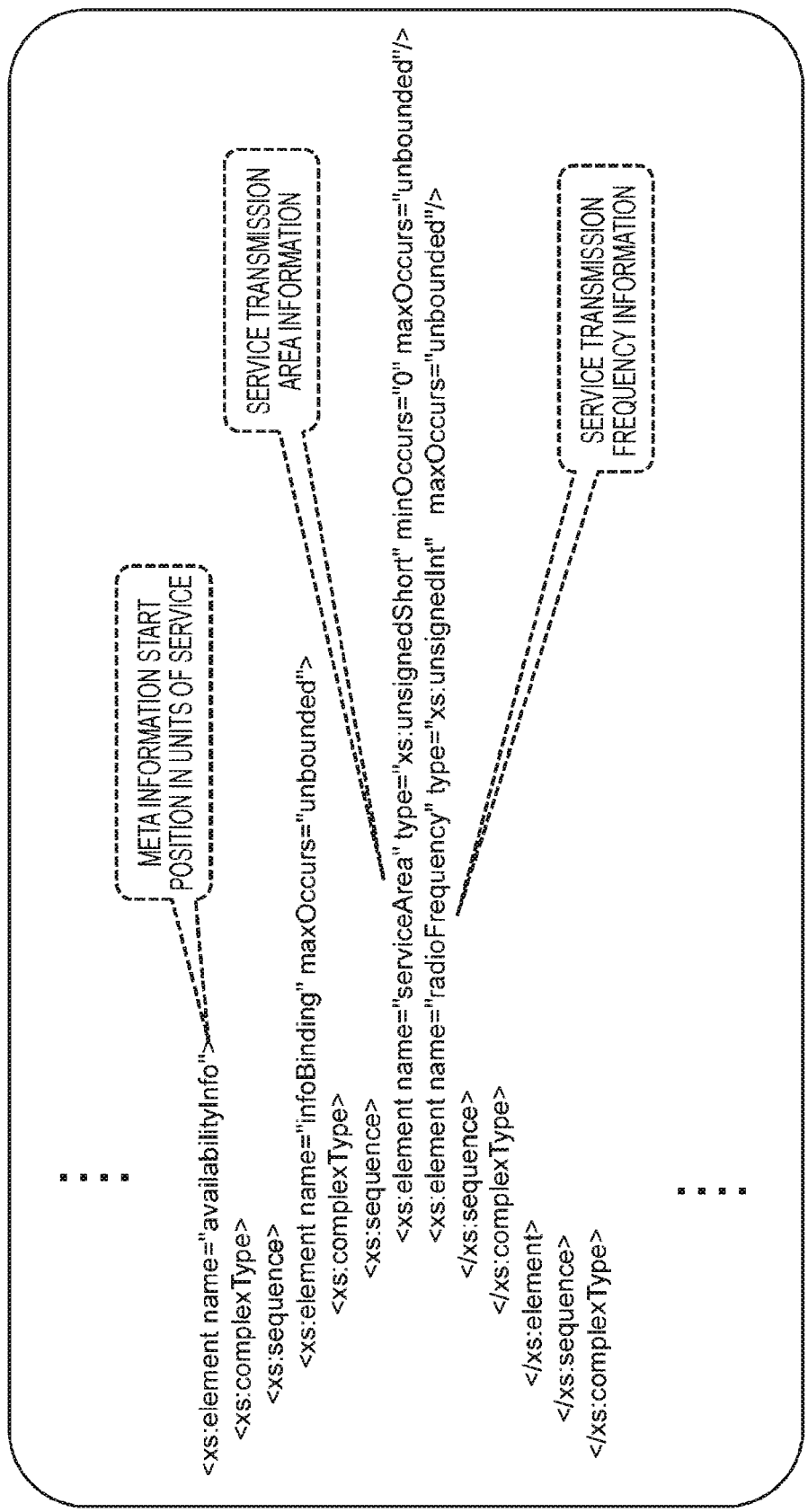
FIG. 4 is a view illustrating a data structure example of metadata supplied from the data transmission device to the user terminal.
Figure 5:
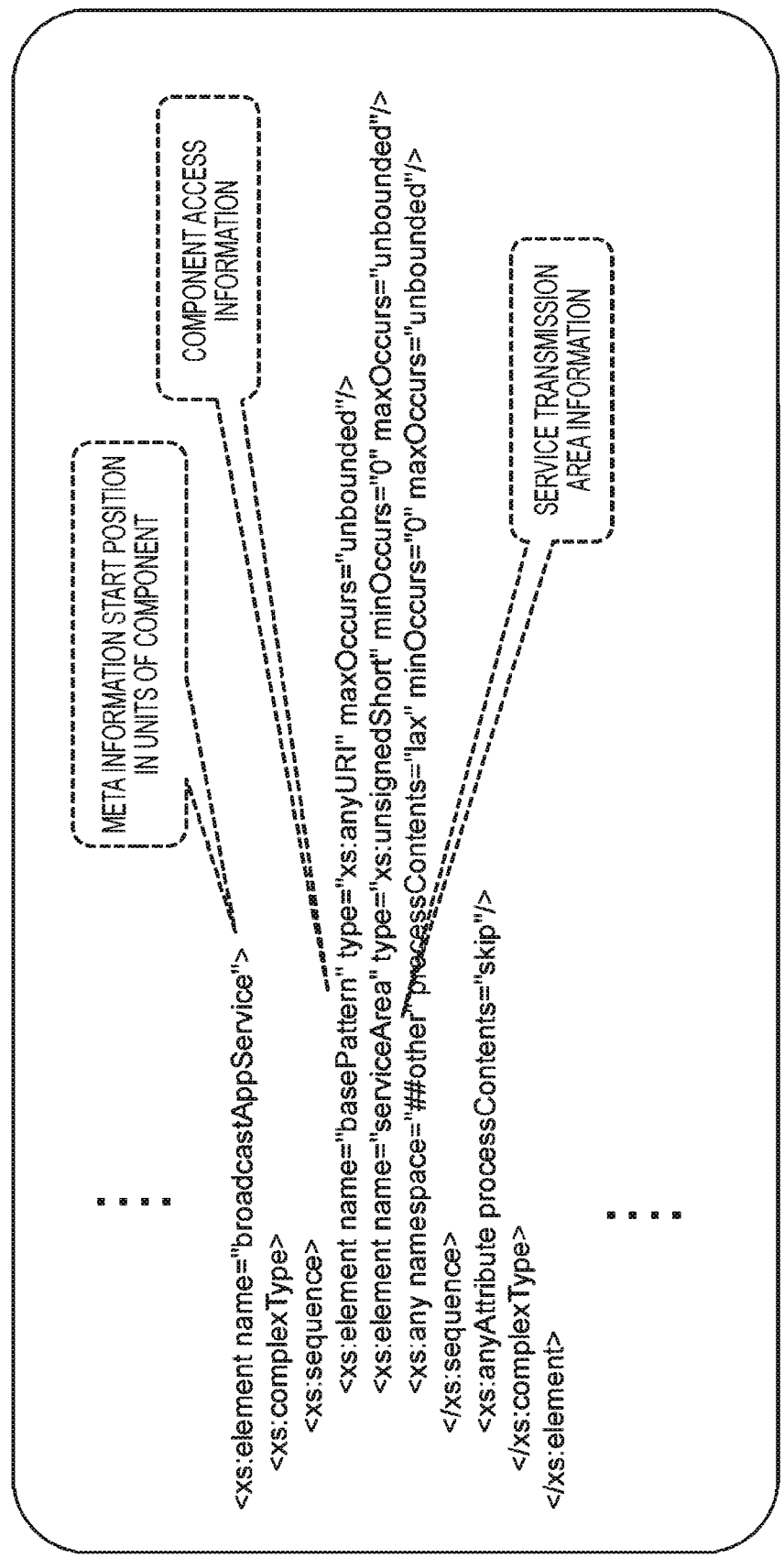
FIG. 5 is a view illustrating a data structure example of metadata supplied from the data transmission device to the user terminal.

USD illustrated in FIGS. 4 and 5 is a part of definition of XML data structure constituting User Service Description (USD) described in specifications disclosed in December, 2013, by 3GPP (3GPP TS26. 346V12. 00).

FIG. 4 shows definition of metadata, i.e., availability Info elements associated with an MBMS user service, while FIG. 5 shows definition of metadata, i.e., broadcastAppService elements associated with an MBMS user service.

As described above, a service is content such as movie content supplied by broadcast delivery to the plurality of user terminals (UEs) under eMBMS, or content supplied as a TV program, Video onDemand (VoD) or the like. A service is constituted by a plurality of components.

For example, one "service" is one piece of movie content or the like. One "service" may contain components allowed for a plurality of individual accesses and individual deliveries.

Examples of a component include image data having a particular resolution, audio data in a particular language, and subtitle data in a particular language.

Metadata in units of service illustrated in FIG. 4 contains [service transmission area information] indicating an area to which a service (such as certain program content) is transmitted, and [service transmission frequency information] indicating a transmission frequency band of the corresponding service.

On the other hand, metadata in units of component illustrated in FIG. 5 contains access information about a component, such as [component access information] like URI, and [component transmission area information] indicating an area to which the corresponding component is transmitted.

The user terminal having received metadata constituted by XML data illustrated in FIGS. 4 and 5 analyzes the received metadata, and acquires a desired component based on [component access information] about the corresponding component.

However, the metadata in units of component illustrated in FIG. 5 does not describe transmission frequency information about a component.

Transmission frequency information is only described in units of service as illustrated in FIG. 4, and not described in units of component in metadata.

Accordingly, the user terminal 20 is not allowed to execute reception setting for receiving a component transmitted only at a particular frequency.

For example, transmission frequency information in units of service described in metadata illustrated in FIG. 4 indicates one transmission frequency corresponding to a main component contained in a service.

More specifically, the metadata indicates the transmission frequency of the main components transmitted in the macro-cell 51 under settings as illustrated in FIG. 2. According to the example illustrated in FIG. 2, [service transmission frequency information] described in the metadata in units of service in FIG. 4 indicates a transmission frequency of [800 MHz] for the main components of (1) base layer image data, and (2) Japanese audio data.

The user terminal 20 therefore executes reception setting of the user terminal 20 in correspondence with the transmission frequency of [800 MHz] of the main components recorded in the metadata in units of service illustrated in FIG. 4 to receive the main components.

However, when the user terminal located in the first small-cell 61 in FIG. 2 desires to receive Korean voices transmitted only in the first small-cell 61, transmission frequency information (1.5 GHz) about the component (Korean voices) is not recorded in the metadata supplied from the data transmission device 12. Accordingly, the user reception terminal 20 desiring to receive Korean voices is difficult to execute reception setting for receiving Korean voices.

A sequence generating this problem is further detailed hereinbelow with reference to the sequence chart illustrated in FIG. 3.

(Step S13)

The user terminal 20 having received USD (metadata illustrated in FIGS. 4 and 5) from the data transmission device 12 analyzes information recorded in metadata, and accesses a component based on the [component access information], such as URI, about the desired component. The user terminal 20 performs this process based on metadata recording information in units of component illustrated in FIG. 5. Furthermore, in a setting process on the user terminal 20 side, the user terminal 20 executes reception setting for communication data received by the user terminal 20 based on [service transmission frequency information] recorded in the metadata.

This process is performed based on metadata recording information in units of service illustrated in FIG. 4.

As described above, the [service transmission frequency information] recorded in the metadata illustrated in FIG. 4 is only a set of frequency band information associated with a main component of the corresponding service.

(Step S14)

The user terminal 20 attempts to receive the component accessed based on the [component access information] recorded in the metadata illustrated in FIG. 5 corresponding to the component.

When the component to be received is the main component of the service to which the component belongs, and contains data transmitted at a frequency band recorded in the [service transmission frequency information] recorded in the metadata in units of service illustrated in FIG. 4, the component is receivable based on agreement between the frequency band of the data and the reception frequency set in step S13.

However, when the component to be received is not the main component of the service to which the component belongs, and contains data transmitted at a frequency band different from the frequency band recorded in the [service transmission frequency information] recorded in the metadata in units of service illustrated in FIG. 4, the transmission frequency of the component is different from the reception frequency set in step S13. In this case, the component may be difficult to receive by the user terminal 20.

[3. Process Example of Present Disclosure for Notification about Transmission Frequency Per Component]

An embodiment for solving the aforementioned problems is hereinafter described.

The embodiment discussed hereinbelow is an example notifying the user terminal about a transmission frequency in units of component.

Figure 6:
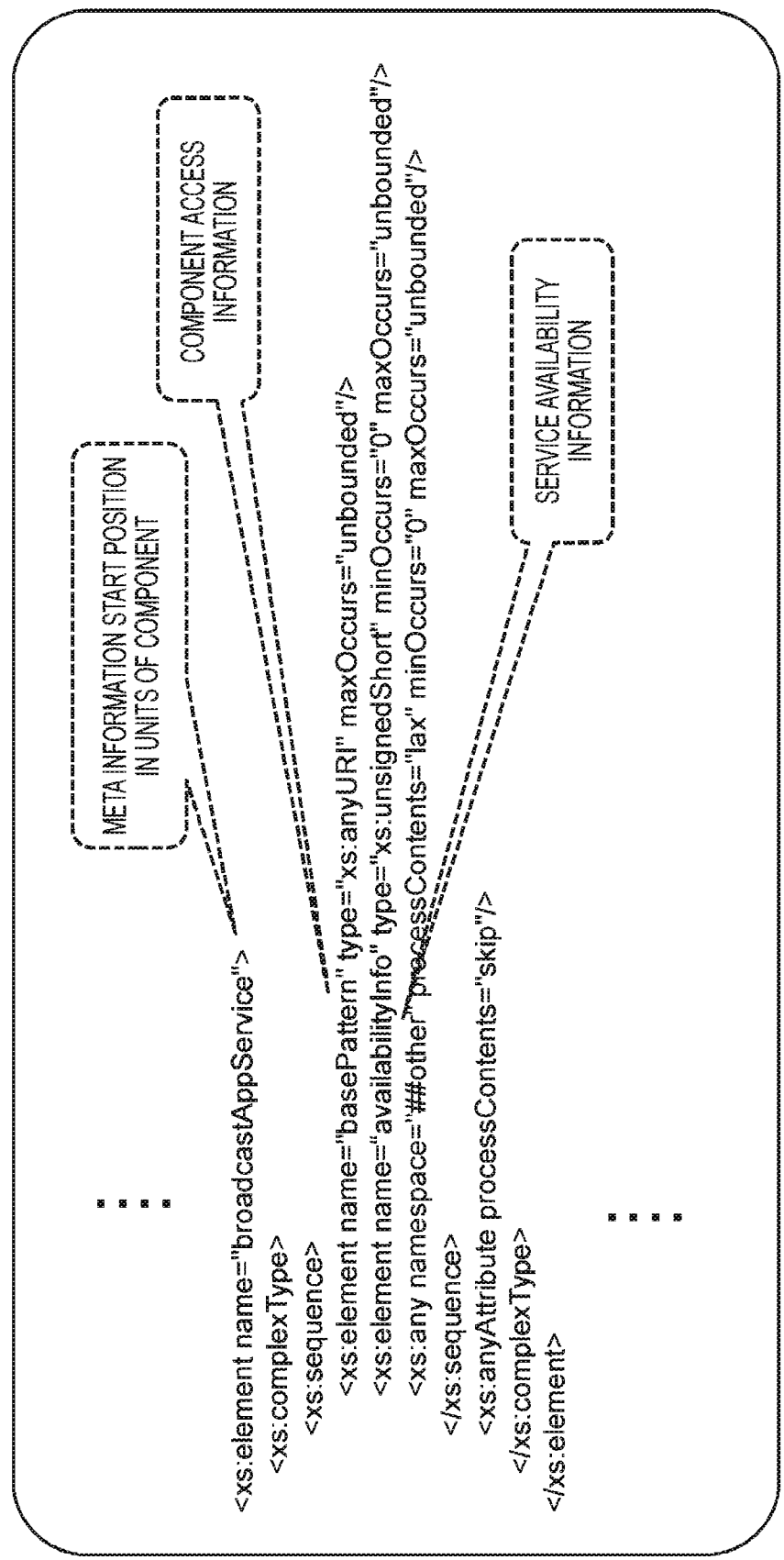
FIG. 6 is a view illustrating a data structure example of metadata supplied from the data transmission device to the user terminal.

FIG. 6 illustrates definition of an XML data structure of broadcastAppService elements, i.e., apart of metadata (USD: User Service Description) supplied to the user terminal 20 from the data transmission device 12 in the process of this embodiment.

According to this embodiment, XML data structure definition of current broadcastAppService elements described above with reference to FIG. 5 is replaced with XML data structure definition illustrated in FIG. 6.

The structure illustrated in FIG. 6 is different from the structure illustrated in FIG. 5 in that "service transmission area information (ServiceArea)" contained in XML data structure definition illustrated in FIG. 5 is replaced with "service availability information (availabilityInfo)" in XML structure definition illustrated in FIG. 6.

The "service availability information (availabilityinfo)" contained in XML data structure definition illustrated in FIG. 6 is determined as transmission frequency information in units of component corresponding to a constituent element of one service, or as a recording area for recording component transmission area information. The XML data structure definition of broadcastAppService elements illustrated in FIG. 6 notifies the user terminal 20 about transmission frequency information and component transmission area information in units of component.

Figure 7:
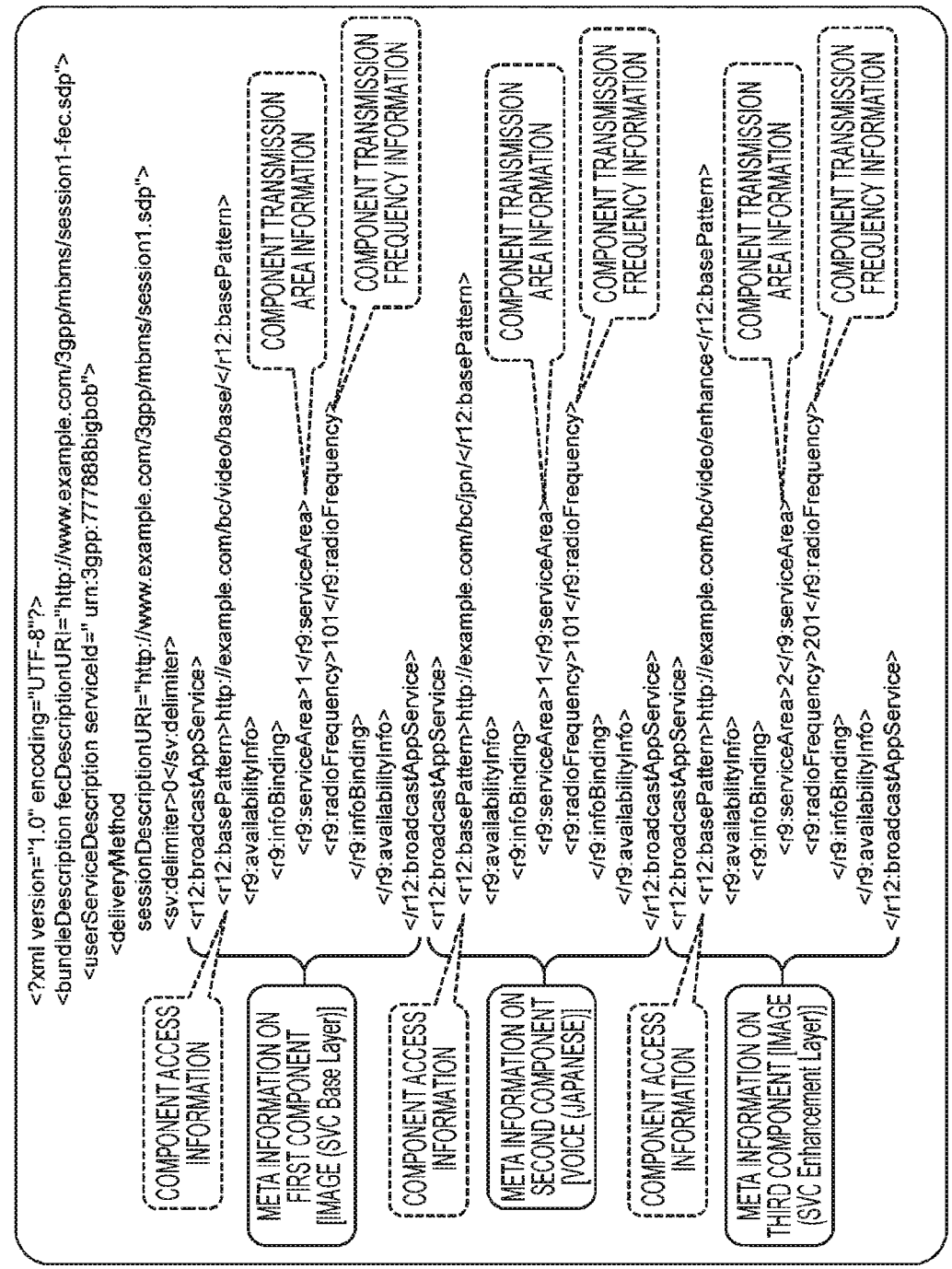
FIG. 7 is a view illustrating an example of metadata supplied from the data transmission device to the user terminal.
Figure 8:
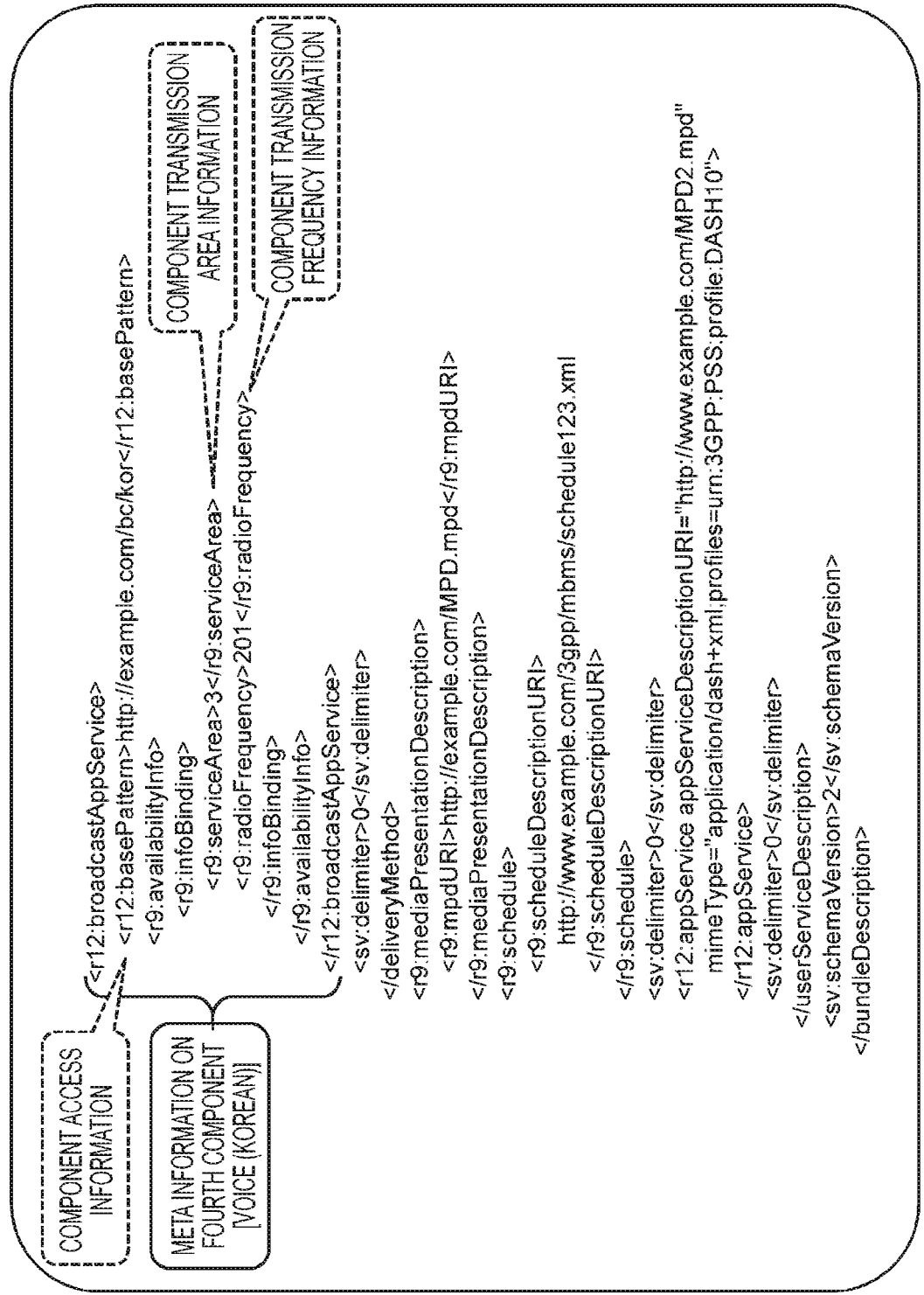
FIG. 8 is a view illustrating an example of metadata supplied from the data transmission device to the user terminal.

FIGS. 7 and 8 illustrate XML data examples showing a part of metadata (USD: (User Service Description) supplied to the user terminals 20 from the data transmission device 12 in the process of this embodiment.

Each of the metadata (USD) illustrated in FIGS. 7 and 8 is a description example of metadata (USD) corresponding to respective components in the data delivery structure described above with reference to FIG. 2.

According to the settings illustrated in FIG. 2, the following four components are contained in one content delivery service.

(1) First Component
Transmission data: base layer image
Transmission area: whole area within macro-cell 51
Transmission frequency: 800 MHz
(2) Second Component
Transmission data: Japanese voices
Transmission area: whole area within macro-cell 51
Transmission frequency: 800 MHz
(3) Third Component
Transmission data: enhancement layer image
Transmission area: area within first small-cell 61
Transmission frequency: 1.5 GHz
(4) Fourth Component
Transmission data: Korean voices
Transmission area: area within second small-cell 62
Transmission frequency: 1.5 GHz Each of the metadata (USD) illustrated in FIGS. 7 and 8 records the following sets of information in units of component for each of components (1) through (4).

(a) Component access information
(b) Component transmission area information
(c) Component transmission frequency information The user terminal 20 receives, from the data transmission device 12, metadata (USD) which records access information, transmission area information, and transmission frequency information in units of component. The user terminal 20 selects a desired component, and accesses the component based on the component access information (such as URI) contained in the metadata corresponding to the selected component. The user terminal 20 further checks the transmission frequency of the selected component while referring to the component transmission frequency information contained in the metadata corresponding to the selected component, and executes setting of the user terminal in a manner allowing reception of data at the checked frequency.

The user terminal is capable of checking not only the access information and transmission area, but also the transmission frequency for all of the components contained in a certain service with reference to the metadata (USD) illustrated in FIGS. 7 and 8. Accordingly, the user terminal is allowed to securely receive a transmission component within the transmission area of the component.

Figure 9:
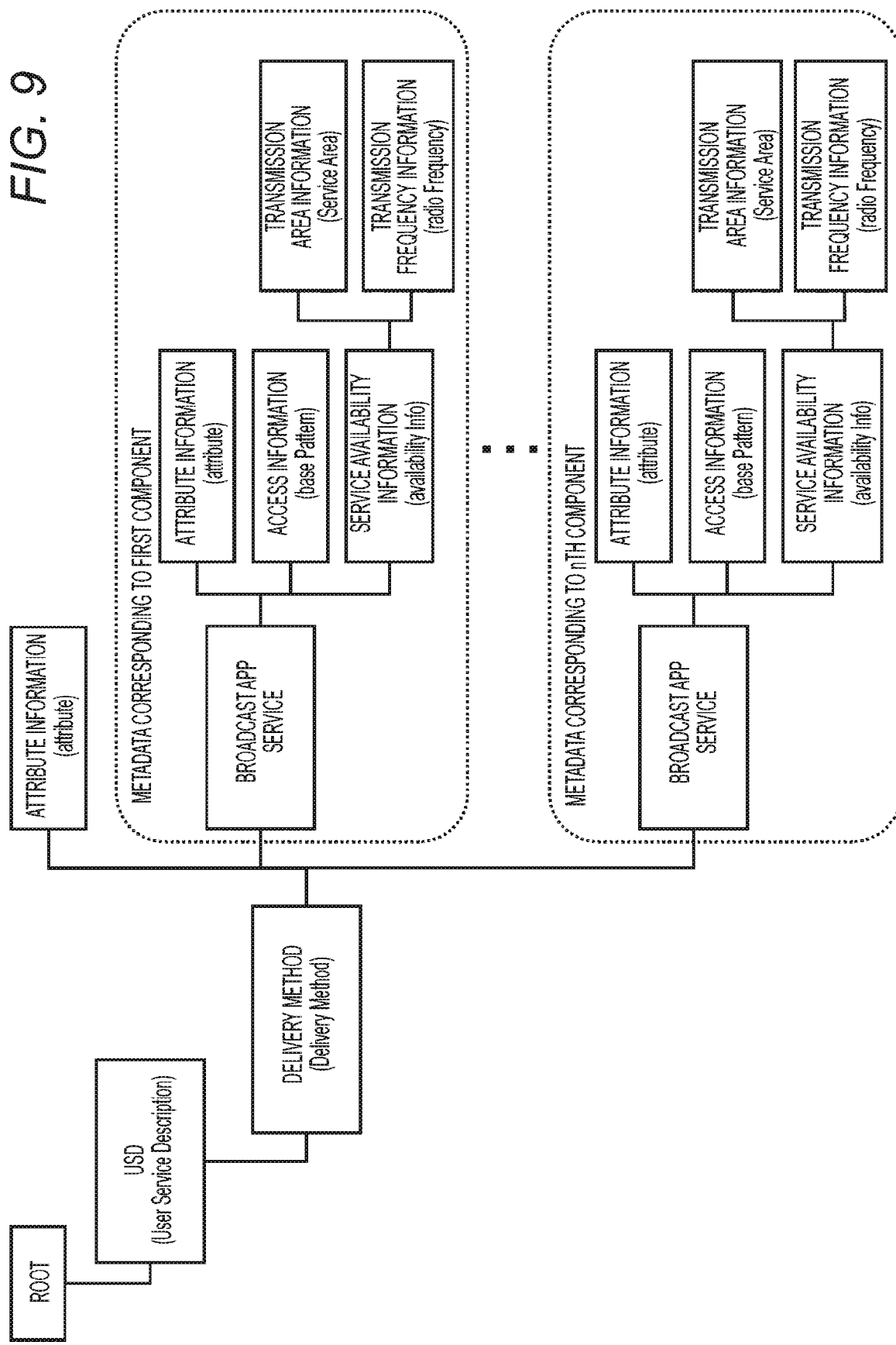
FIG. 9 is a view illustrating a directory configuration example of metadata retained in a storage unit of the data transmission device.

FIG. 9 is a directory diagram illustrating a data structure of USD corresponding to the metadata described with reference to FIGS. 7 and 8, i.e., metadata produced in correspondence with a service supplied to the user terminal from the data transmission device 12.

For example, metadata (USD) having a directory structure illustrated in FIG. 9 is stored in the storage unit of the data transmission device 12. The data transmission device 12 supplies the stored metadata to the user terminal.

The directory structure of USD illustrated in FIG. 9 is hereinafter described. USD is metadata which records information about respective services, and components contained in the services. The metadata contains structure information about components corresponding to delivery targets, and delivery mode information (delivery methods) about components, for example.

The directory illustrated in FIG. 9 is a directory associated with delivery mode information (delivery methods) corresponding to a part of information contained in USD.

As illustrated in FIG. 9, a USD directory corresponding to one service is set in the order below Root. A delivery method directory is set in the order below the USD directory.

A "broadcast app service" directory corresponding to respective components is set in the order below the delivery method directory. This "broadcast app service" directory shows details of delivery mode information concerning each of the components contained in the service.

Access information (base pattern), transmission area information (service area), and transmission frequency information (radio frequency) of the respective components are recorded in the order below the "broadcast app service" directory corresponding to the respective components.

Data in the order below the "broadcast app service" directory is set in units of component. One area surrounded by a dotted rectangular frame illustrated in FIG. 9 indicates metadata corresponding to one component.

More specifically, this area corresponds to any one of the types of metadata corresponding to the first through fourth components described with reference to FIGS. 7 and 8.

According to the example illustrated in FIG. 9, the "broadcast app service" directory is set for each of n components, i.e., metadata corresponding to the first component through metadata corresponding to the nth component. Access information (base pattern), transmission area information (service area), and transmission frequency information (radio frequency) about each component are recorded in the corresponding directory.

Metadata having the directory structure illustrated in FIG. 9 is stored in the storage unit of the data transmission device 12. The data transmission device 12 acquires the stored metadata and supplies the metadata to the user terminal 20 in response to a request from the user terminal 20, for example.

Thereafter, the user terminal 20 is capable of receiving the foregoing metadata illustrated in FIGS. 7 and 8, for example, and can check access information, transmission area information, and transmission frequency information in units of component.

Figure 10:
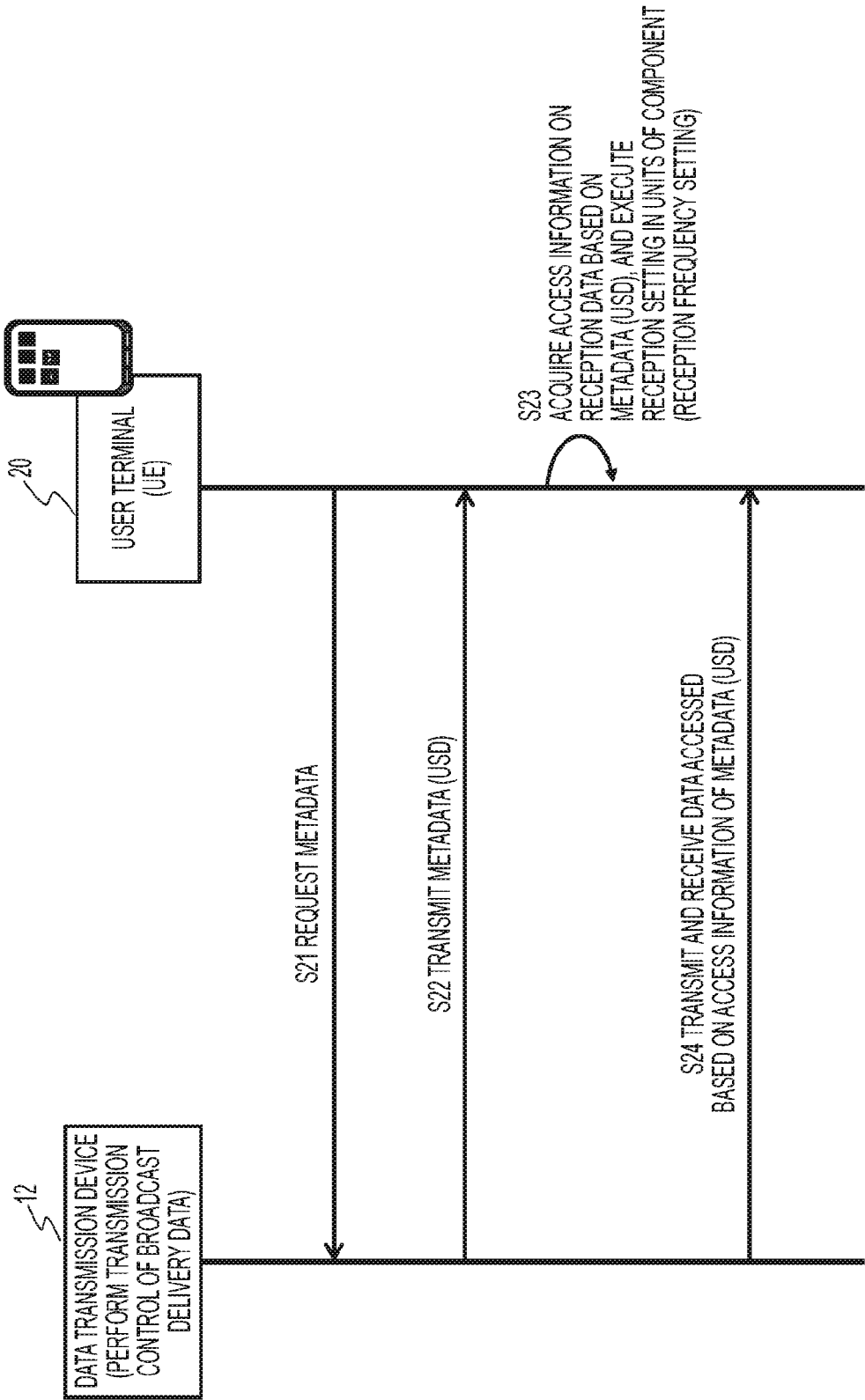
FIG. 10 is a view illustrating an example of a communication sequence between the data transmission device and the user terminal.

Described hereinbelow with reference to FIG. 10 is a communication sequence executed between the data transmission device 12 and the user terminal 20 in the structure allowing acquisition of the foregoing metadata.

FIG. 10 illustrates a communication sequence for communication of various types of components between the data transmission device 12 performing a broadcast delivery process via a selected base station, and the user terminal 20 receiving broadcast delivery data transmitted from the data transmission device 12, similarly to the sequence described above with reference to FIG. 3.

As discussed with reference to FIG. 1, communication between the data transmission device 12 and the user terminal is realized via the base station 13. However, the sequence chart in FIG. 10 does not show the base station 13.

It is assumed that the user terminal 20 has already received, from the data transmission device 12, service information available from the data transmission device 12, such as a program list or other types of content list available from the data transmission device 12. The sequence illustrated in FIG. 10 is a sequence performed after a user operating the user terminal 20 inputs selection of a particular service (program or other content) from the received content list. Processes in respective steps illustrated in FIG. 10 are hereinafter sequentially described.

(Step S21)

The user terminal 20 requests the data transmission device 12 to transmit metadata corresponding to a service input from the user based on corresponding service selection information (such as selection information on program or movie title).

Metadata corresponding to services supplied from the data transmission device 12, i.e., metadata (USD) described with reference to FIGS. 7 through 10, is stored in the storage unit of the data transmission device 12. The data transmission device 12 supplies the stored metadata to the user terminal in response to the request received from the user terminals 20.

(Step S22)

In response to the request from the user terminal 20 requesting metadata corresponding to the service selected by the user, the data transmission device 12 transmits metadata corresponding to the selected service to the user terminal 20.

More specifically, the data transmission device 12 transmits metadata (USD: User Service Description) recording access information, transmission area information, and transmission frequency information in units of component illustrated in FIGS. 7 and 8.

The sequence chart illustrated in FIG. 10 is a sequence of a metadata supply process performed by the data transmission device 12 for supplying metadata to the user terminal 20 in response to a metadata request issued from the user terminal in units of service. However, the manner of metadata supply is not limited to this process on the basis of a request from the user terminal in units of service.

For example, metadata on respective services may be contained in a content list corresponding to a list of a plurality of services, such as a program list, and supplied to the user terminal 20 beforehand. In this case, the user terminal is allowed to browse metadata corresponding to a particular program (service) while selecting the program from the program list.

(Step S23)

The user terminal 20 having received USD (such as metadata illustrated in FIGS. 7 and 8) from the data transmission device 12 analyzes information recorded in the metadata, and accesses a desired component based on [component access information] about the component.

The user terminal 20 further checks transmission frequency information in units of component with reference to the metadata, and executes a terminal setting process for determining settings allowing reception of transmission frequency data about the selected component. This process may be executed based on component transmission frequency information recorded in metadata (USD) described with reference to FIGS. 7 and 8, for example.

(Step S24)

The user terminal 20 accesses the component based on [component access information] recorded in the metadata illustrated in FIGS. 7 and 8, for example.

The user terminal 20 has already completed reception setting for allowing reception of the selected component based on [component transmission frequency information] recorded in the metadata illustrated in FIGS. 7 and 8. Accordingly, the user terminal 20 is capable of securely receiving the selected component.

According to this embodiment, therefore, [component transmission frequency information] in units of component is recorded in metadata supplied from the data transmission device 12. According to this structure, the user terminal 20 is capable of executing reception setting of the user terminal while checking the transmission frequency of a component intended to be received. Accordingly, the user terminal 20 is capable of securely receiving the component when the user terminal 20 is located within a transmission area of the component.

[4. Configuration and Process of Communication Device]

A configuration and a process of a device for executing processing of the present disclosure are hereinafter described with reference to FIG. 11.

Figure 11:
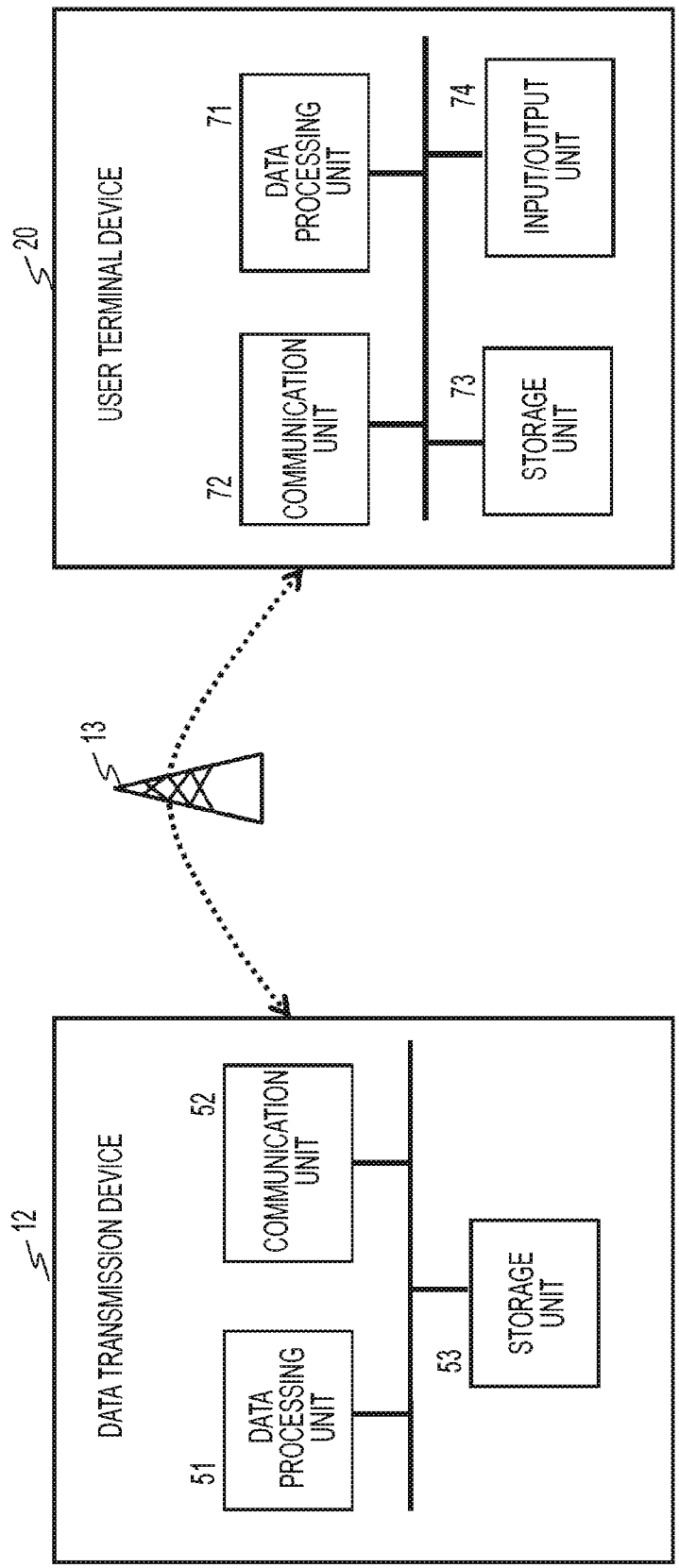
FIG. 11 is a view illustrating a configuration example of respective devices.

FIG. 11 illustrates a configuration example of the data transmission device 12 and the user terminal 20.

The data transmission device 12 includes a data processing unit 51, a communication unit 52, and a storage unit 53.

The user terminal 20 includes a data processing unit 71, a communication unit 72, a storage unit 73, and an input/output unit 74.

The data processing unit 51 of the data transmission device 12 executes various types of data processing for executing a broadcast delivery service. For example, the data processing unit 51 generates constituent data of a broadcast delivery service, and performs transmission control. The data processing unit 51 further generates metadata which records transmission frequency information in units of component corresponding to a data element allowed for independent delivery to the user terminal 20, or acquires this metadata from the storage unit 53, and then transmits the generated or acquired metadata via the communication unit 52. The metadata is data described above with reference to FIGS. 7 and 8.

A component corresponds to a data element contained in one broadcast delivery service and allowed for independent delivery, while metadata is a structure which records transmission frequency information corresponding to each of all components contained in one broadcast delivery service as described with reference to FIGS. 7 and 8.

The data processing unit 51 transmits metadata which records access information in units of component, and transmission area information in units of component, in addition to the transmission frequency information in units of component, to the user terminal 20 via the communication unit 52 as described with reference to FIGS. 7 and 8.

The data processing unit 51 executes communication control for transmitting, at a different transmission frequency, a component corresponding to a data element contained in one broadcast delivery service and allowed for independent delivery.

As described with reference to FIG. 2, a particular component is transmitted, at a transmission frequency corresponding to the component, only to a particular area via a base station selected in units of component.

The data processing unit 51 reads metadata from the storage unit 53, and transmits the metadata to the user terminal via the communication unit 52 in response to a request from the user terminal 20.

The user terminal 20 includes a data processing unit 71, a communication unit 72, a storage unit 73, and an input/output unit 74.

The communication unit 72 receives broadcast delivery data from the data transmission device 12 via the base station 13.

The data processing unit 71 executes decoding, reproduction and other processes for the broadcast delivery data. The reproduced data is output via the input/output unit 74.

An instruction command from a user, such as an instruction command for selecting a service or a component, is input via the input/output unit 74.

The communication unit 72 receives, from the data transmission device 12, metadata which records transmission frequency information in units of component that is constituent data of a broadcast delivery service and corresponds to a data element allowed for independent delivery to the user terminal 20, i.e., metadata described with reference to FIGS. 7 and 8.

The data processing unit 71 executes setting of a reception frequency allowing reception of a component based on the transmission frequency information in units of component recorded in the received metadata.

A component is a data element contained in one broadcast delivery service and allowed for independent delivery.

Metadata is a structure which records access information in units of component, and transmission area information in units of component, in addition to the transmission frequency information corresponding to each of all components contained in one broadcast frequency information as described with reference to FIGS. 7 and 8.

When a plurality of components intended to be received are transmitted at different frequencies, the data processing unit 71 executes setting of reception frequencies allowing reception of the plurality of components based on different sets of transmission frequency information recorded in the metadata for the plurality of components.

In other words, the data processing unit 71 performs communication control for receiving, at different transmission frequencies, respective components corresponding to data elements contained in one broadcast delivery service and allowed for independent delivery.

Processing layers performed by the data transmission device 12, the base station 13, and the user terminal 20 are hereinafter described with reference to FIG. 12.

The data transmission device 12 and the user terminal execute a communication process for communication with each other via the base station 13.

Figure 12:
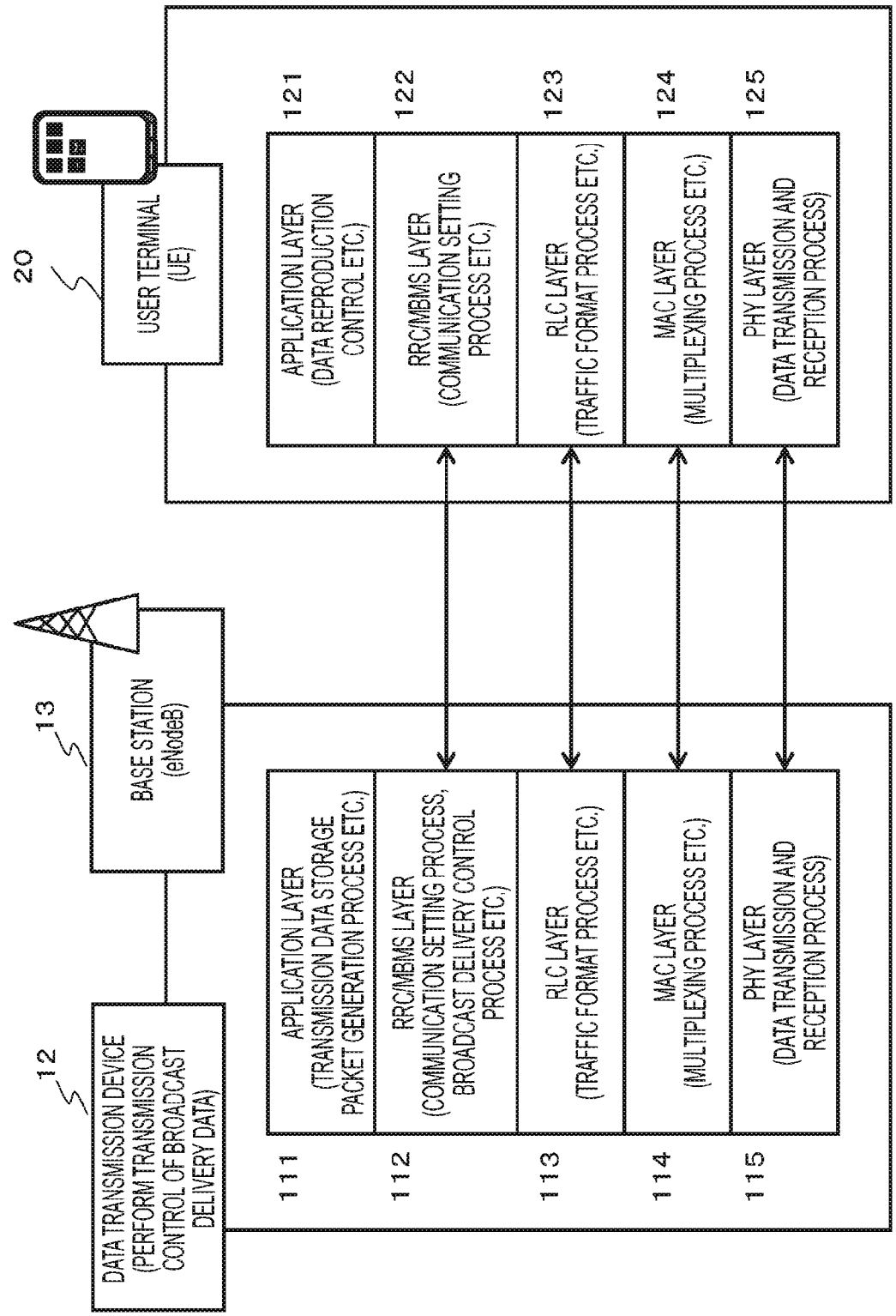
FIG. 12 is a view illustrating a configuration example of processing layers of the respective devices.

FIG. 12 illustrates a set of layer structure indicating processes executed by both the data transmission device 12 and the base station 13. The data transmission device 12 controls the plurality of base stations 13. For example, the data transmission device 12 executes a process for transmitting a particular component from the selected base station.

The data transmission device 12 and the base station 13 may share the plurality of processes for transmission and reception of data to and from the user terminal 20. There are various possible settings in sharing of the processes, wherefore the processes executed by the data transmission device 12 and the base station 13 are shown in the form of a set of processing layers in FIG. 12.

The processing layers executed by the data transmission device 12 and the base station 13 are constituted by the following layers.

application layer 111,
RRC/MBMS layer 112,
RLC layer 113,
MAC layer 114, and
PHY layer 115

The application layer 111 performs a process for encoding an image stream and an audio stream, and a process for generating packets storing a component constituted by these encoded data, for example.

The RRC/MBMS layer 112 is a layer which performs communication control in a communication setting process and a broadcast communication process for communication with the user terminal 20, for example. The Radio Resource Control (RRC) layer 113 performs handover process control of the user terminal, for example. The Multimedia Broadcast Multicast Service (MBMS) layer chiefly performs broadcast communication control.

The Radio Linc Control (RLC) layer 114 is a layer which executes a control process for communication traffic in the communication process for communication with the user terminal 20.

The MAC layer executes a communication scheduling process, a packet multiplexing process and others in the communication process for communication with the user communication terminal 20.

The PHY layer 115 is a physical layer constituted by a communication unit and the like, and executes data transmission and reception in units of component at a predetermined frequency.

The processing layer structure of the user terminal 20 is hereinafter described. The user terminal 20 includes a layer structure substantially similar to the processing layer of the data transmission device 12 and the base station 13. More specifically, the user terminal 20 includes the following layers.

application layer 121,
RRC/MBMS layer 122,
RLC layer 123,
MAC layer 124, and
PHY layer 125

The application layer 21 performs a process for decoding and reproduction of an image stream and an audio stream, and a process for analyzing packets storing a component constituted by these encoded data.

The RRC/MBMS layer 122 is a layer which performs communication control in a communication setting process and a broadcast communication process for communication with the data transmission device 12 and the base station 13, for example.

The Radio Resource Control (RRC) layer performs handover process control of the user terminal, for example. The Multimedia Broadcast Multicast Service (MBMS) layer chiefly performs broadcast communication control.

The Radio Line Control (RLC) layer 123 performs a control process for communication traffic in the communication process for communication with the data transmission device 12 and the base station 13, for example.

The MAC layer 124 executes a communication scheduling process, a packet multiplexing process and others in the communication process for communication with the data transmission device 12 and the base station 13.

The PHY layer 125 is a physical layer constituted by a communication unit and the like, and executes data transmission and reception in units of component at a predetermined frequency.

Hereinafter described is a process performed for each base station of the respective cells in the component delivery structure described above with reference to FIG. 2. This process is discussed in association with the processing layers corresponding to each base station.

The component delivery structure described with reference to FIG. 2 is roughly divided into the following three types of base stations performing different processes.

(A) base stations 13a through 13c in macro-cell 51
(B) base station 13p in small-cell 61
(C) base station 13q in small-cell 62

Figure 13:
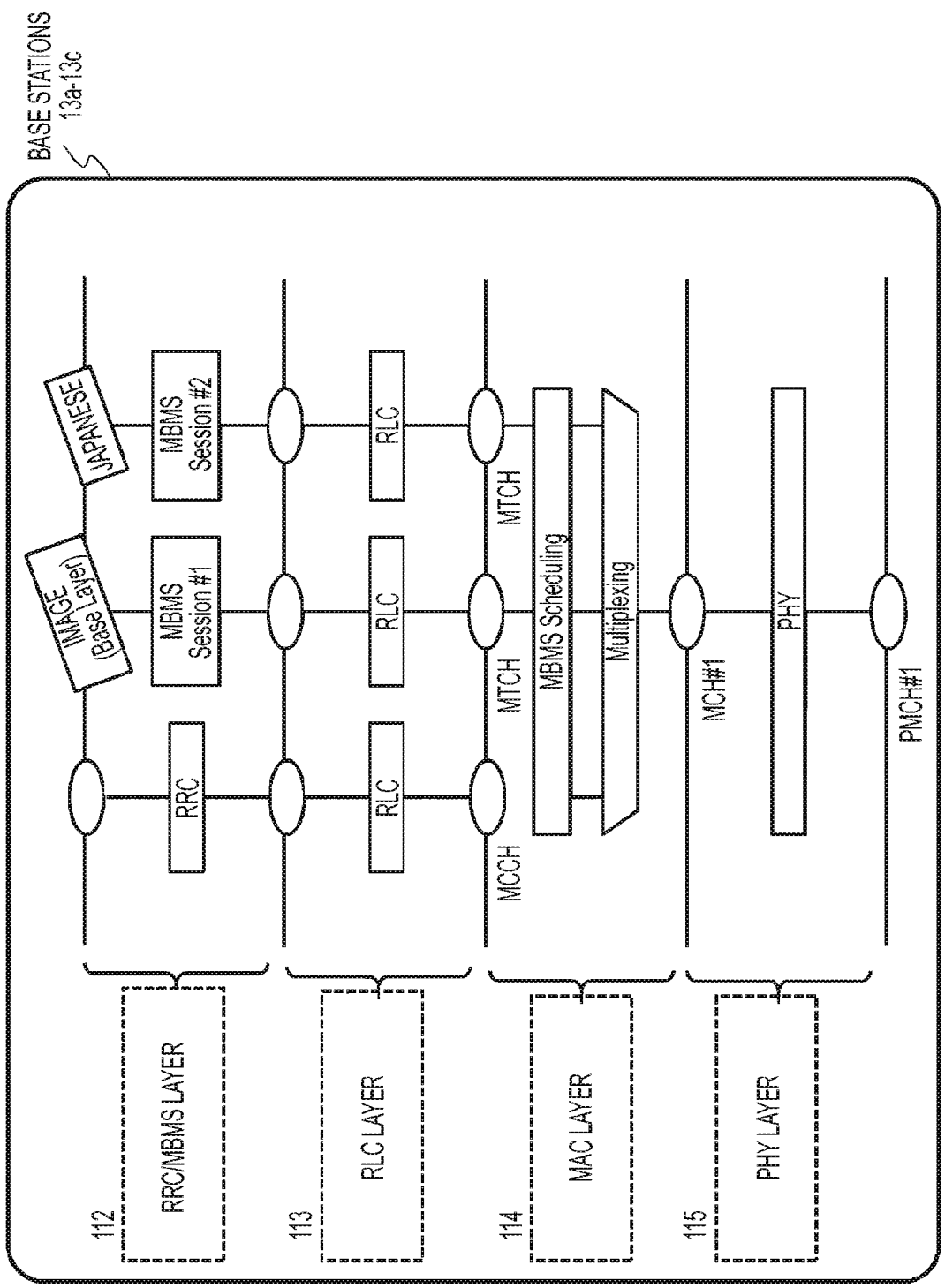
FIG. 13 is a view illustrating a data transmission process executed by base stations.

(A) The base stations 13a trough 13c in the macro-cell 51 transmit the following two components.
(1) First Component
Transmission data: base layer image
Transmission area: whole area within macro-cell 51
Transmission frequency: 800 MHz
(2) Second Component
Transmission data: Japanese voices
Transmission area: whole area within macro-cell 51
Transmission frequency: 800 MHz (B) The base station 13p in the first small-cell 61 further transmits the following component in addition to the foregoing components (1) and (2).
(3) Third Component
Transmission data: enhancement layer image
Transmission area: area within first small-cell 61
Transmission frequency: 1.5 GHz (C) The base station 13q in the second small-cell 62 further transmits the following component in addition to the foregoing components (1) and (2).
(4) Fourth Component
Transmission data: Korean voices
Transmission area: area within second small-cell 62
Transmission frequency: 1.5 GHz FIG. 13 is a view illustrating each layer of processes executed either by the base stations 13a through 13c in the macro-cell 51, or by the data transmission device 12 controlling the base station 13a through 13c in the macro-cell 51.

The processing layers have a layer structure similar to the layer structure of the layers described above with reference to FIG. 12. More specifically, the processing layers have the following layer structure sequentially disposed from the highest order.

RRC/MBMS layer 112,
RLC layer 113,
MAC layer 114, and
PHY layer 115

Each of the base stations 13a through 13c in the macro-cell 51 transmits base layer image data, and Japanese audio data.

The respective processes of the processing layers 112 through 115 illustrated in FIG. 13 are executed either by the base stations 13a through 13c in the macro-cell 51, or by the data transmission device 12 controlling the base stations 13a through 13c in the macro-cell 51.

As described above, the RRC/MBMS layer 112 is a layer which performs communication control in the communication setting process and the broadcast communication process for communication with the user terminal 20, for example. The Radio Resource Control (RRC) layer performs handover process control of the user terminal, for example. The Multimedia Broadcast Multicast Service (MBMS) layer chiefly performs broadcast communication control.

The base stations 13a through 13c in the macro-cell 51, or the data transmission device 12 controlling the base stations 13a through 13c in the macro-cell 51 individually generates two data streams of
basic layer image data, and
Japanese audio data, and
performs broadcast delivery control for the user terminal 20.

The Radio Line Control (RLC) layer 113 executes a control process for communication traffic in the communication process for communication with the user terminal 20.

The RLC layer 113 executes control for delivering respective data streams of basic layer image data and Japanese audio data to the plurality of user terminals 20 without delay, for example.

An MCCH illustrated in the figure is a multicast control channel (MCCH: Multicast Control Channel).

An MTCH is a multicast traffic channel (MTCH: Multicast Traffic Channel).

Each line in the figure indicates flow of data flowing through respective channels.

The MAC layer 114 executes a communication scheduling process, a packet multiplexing process and others in the communication process for communication with the user communication terminal 20.

An MCH illustrated in the figure is a multicast channel (MCH: Multicast Channel).

The PHY layer 115 is a physical layer constituted by a communication unit and the like, and executes data transmission and reception in units of component at a predetermined frequency.

A PMCH is a physical multicast channel (PMCH: Physical Multicast Channel).

Figure 14:
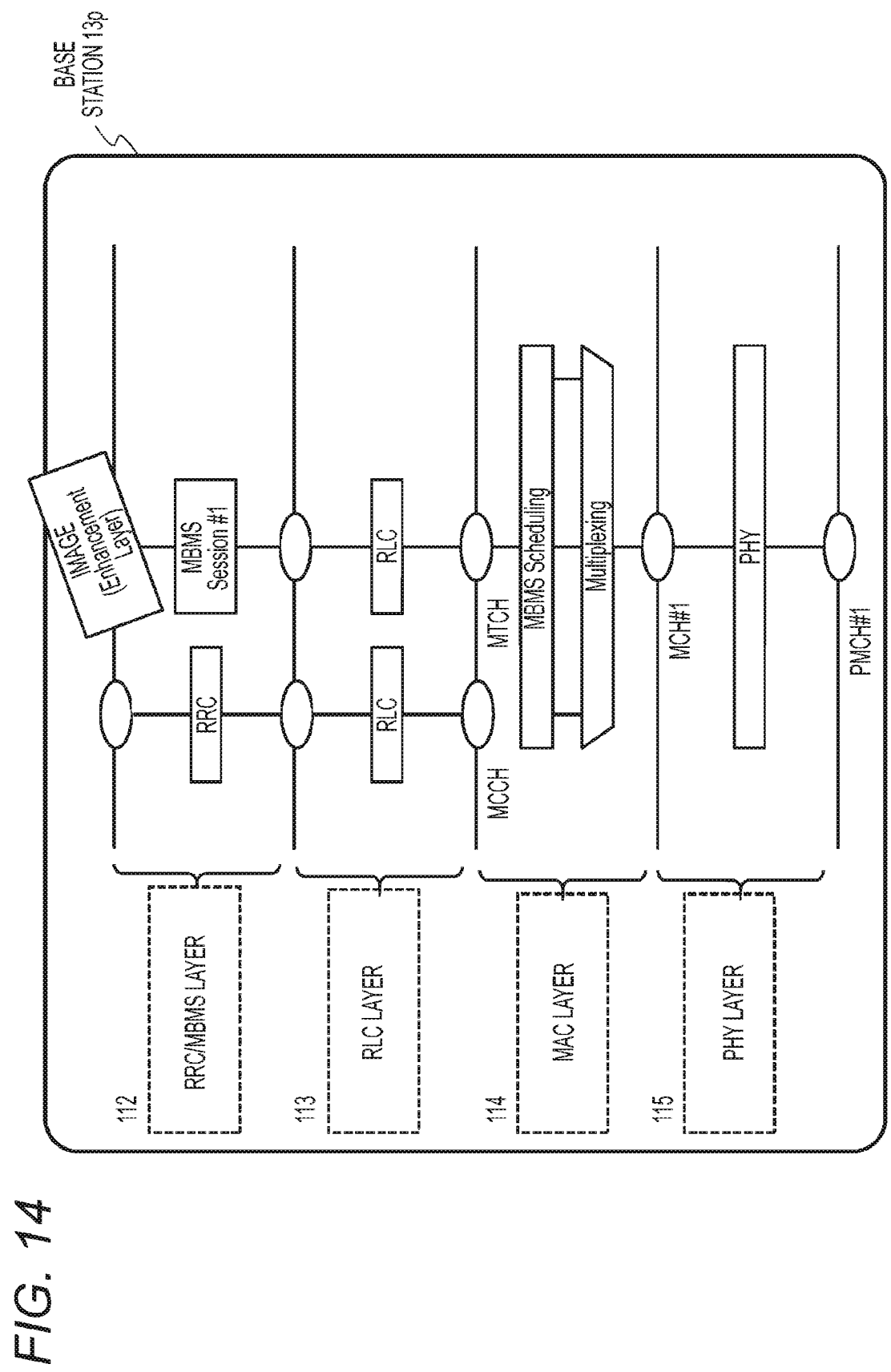
FIG. 14 is a view illustrating a data transmission process executed by a base station.

FIG. 14 is a view illustrating each layer of processes executed by either the base station 13p in the first small-cell 61, or by the data transmission device 12 controlling the base station 13p in the first small-cell 61.

The processing layers have a layer structure similar to the layer structure of the layers described above with reference to FIG. 12. More specifically, the processing layers have the following layer structure sequentially disposed from the highest order.

RRC/MBMS layer 112,
RLC layer 113,
MAC layer 114, and
PHY layer 115

Similarly to the base stations 13a through 13c in the macro-cell 51, the base station 13p in the first small-cell 61 transmits base layer image data and Japanese audio data. In addition, the base station 13p transmits enhancement image data.

The transmission process structure of the base layer image data and the Japanese audio data is similar to the structure illustrated in FIG. 13. FIG. 14 illustrates processing layers associated with a transmission process of enhancement image data corresponding to additional transmission data.

Processes in the processing layer structure of the RRC/MBMS layer 112 through PHY layer 114 are similar to the processes described with reference to FIG. 13.

However, the base station 13p in the first small-cell 61 delivers image data of the enhancement layer in addition to the two data streams of basic layer image data and Japanese audio data.

Accordingly, the base station 13p in the first small-cell 61, or the data transmission device 12 controlling the base station 13p in the first small-cell 61 performs broadcast delivery control also for the data stream of enhancement layer image data in the RRC/MBMS layer in the process of supply to the user terminal 20.

Figure 15:
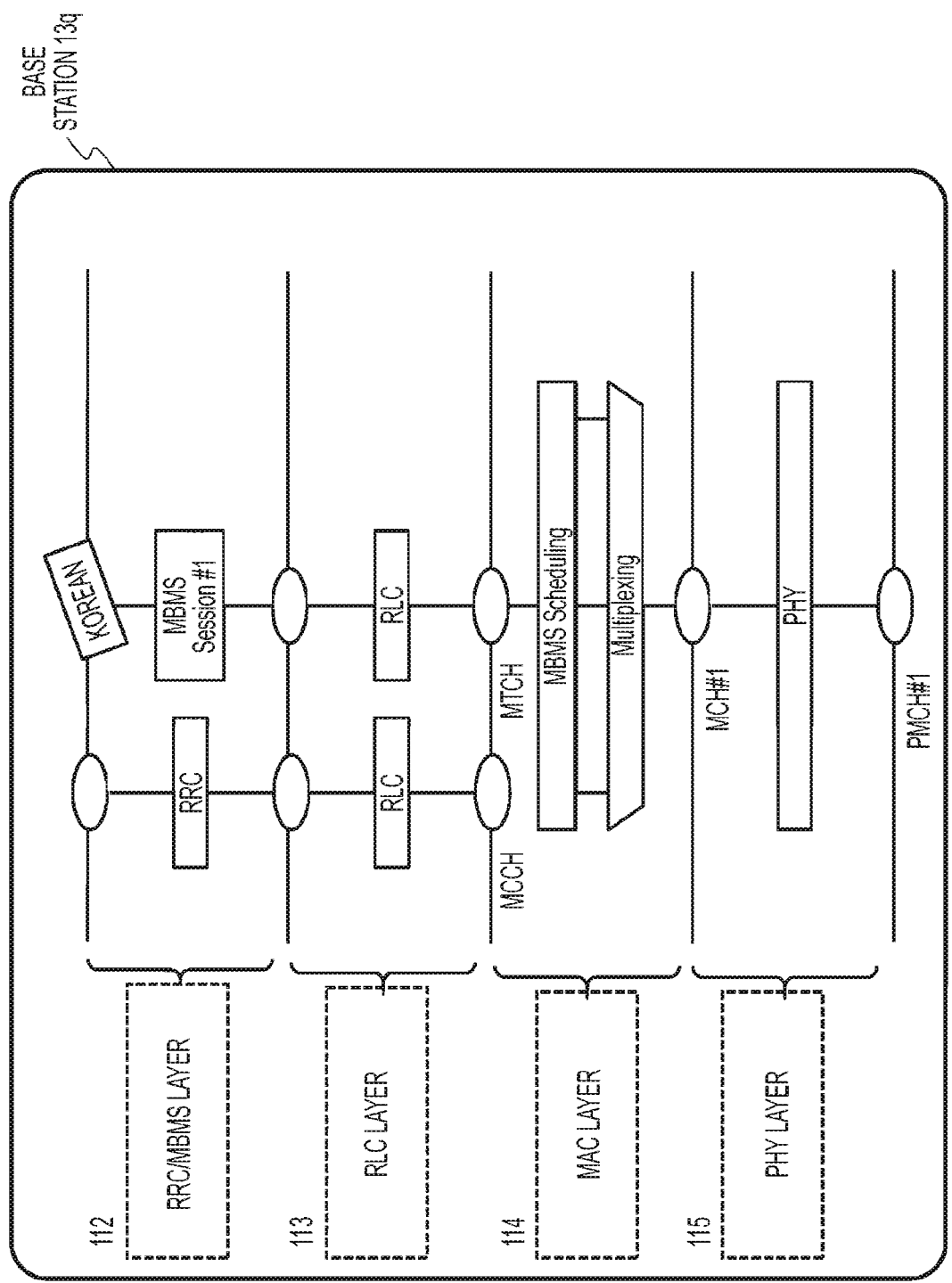
FIG. 15 is a view illustrating a data transmission process executed by a base station.

FIG. 15 is a view illustrating each layer of processes executed by the base station 13q in the second small-cell 62, or by the data transmission device 12 controlling the base station 13q in the second small-cell 62.

The processing layers have a layer structure similar to the layer structure of the layers described above with reference to FIG. 12. More specifically, the processing layers have the following layer structure sequentially disposed from the highest order.

RRC/MBMS layer 112, RLC layer 113, MAC layer 114, PHY layer 115

Similarly to the base stations 13a through 13c in the macro-cell 51, the base station 13q in the second small-cell 62 transmits base layer image data and Japanese audio data. In addition, the base station 13q transmits Korean audio data.

The transmission process structure of the base layer image data and the Japanese audio data is similar to the structure illustrated in FIG. 13. FIG. 15 illustrates processing layers associated with a transmission process of Korean audio data corresponding to additional transmission data.

Processes in the processing layer structure of the RRC/MBMS layer 112 through PHY layer 114 are similar to the processes described with reference to FIG. 13.

However, the base station 13q in the second small-cell 62 delivers the Korean audio data in addition to the two data streams of basic layer image data and Japanese audio data.

Accordingly, the base station 13q in the second small-cell 62, or the data transmission device 12 controlling the base station 13q in the second small-cell 62 performs broadcast delivery control also for the data stream of Korean audio data in the RRC/MBMS layer in the process of supply to the user terminal 20.

[5. Hardware Configuration Example of Devices]

Finally, a hardware configuration example of respective devices executing the foregoing processes is hereinafter described with reference to FIG. 16.

Figure 16:
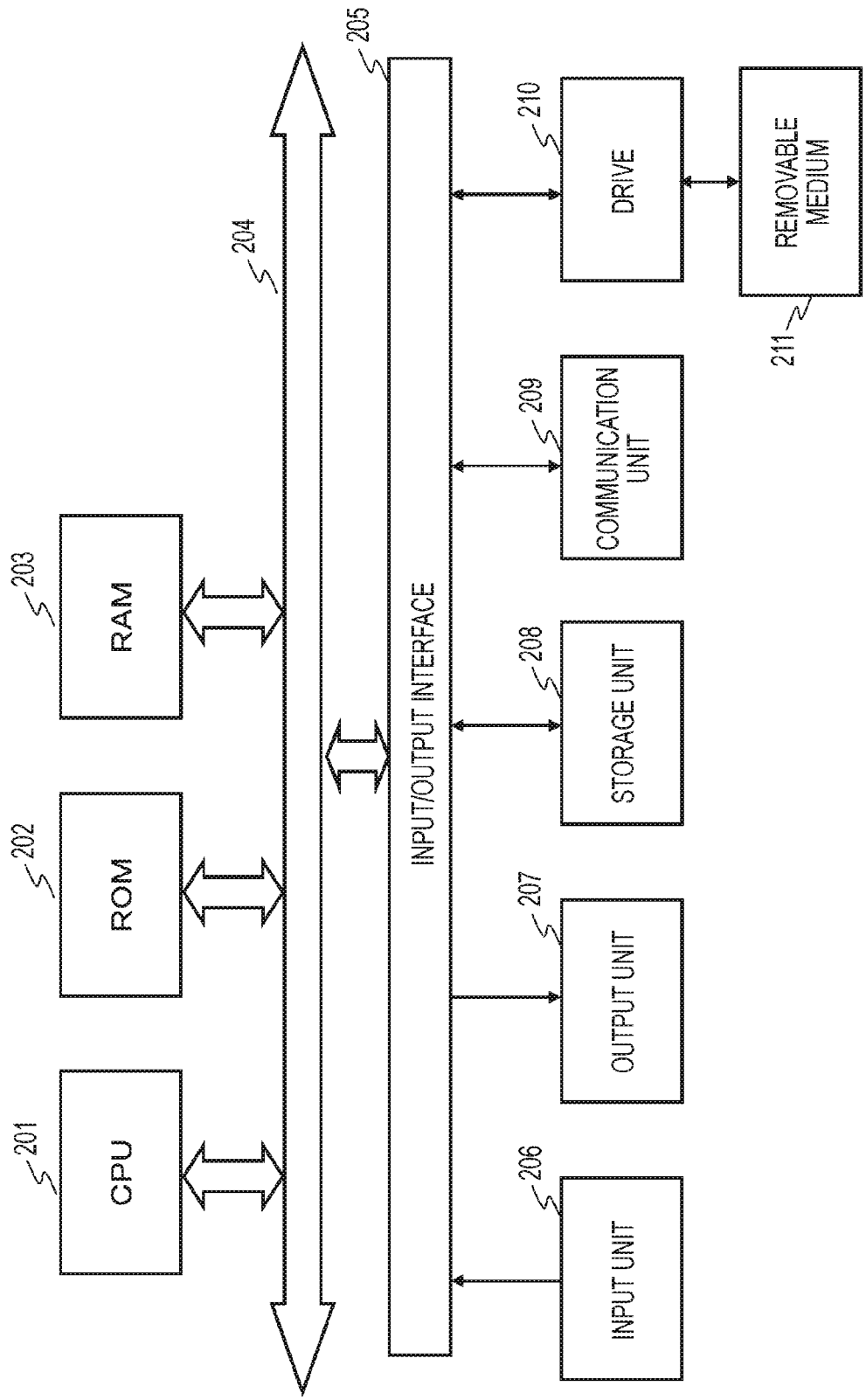
FIG. 16 is a view illustrating a hardware configuration example of a communication device.

FIG. 16 illustrates a hardware configuration example of a communication device applicable to the data transmission device 12 and the user terminal 20.

A Central Processing Unit (CPU) 201 functions as a data processing unit executing various types of processes under programs stored in a Read Only Memory (ROM) 202, or a storage unit 208. For example, the CPU executes processes in accordance with the sequence described in the foregoing embodiment. A Random Access Memory (RAM) 203 stores programs, data and the like executed by the CPU 201. The CPU 201, the ROM 202, and the RAM 203 are connected with each other via a bus 204.

The CPU 201 is connected with an input/output interface 205 via the bus 204. The input/output interface 205 is connected with an input unit 206 constituted by various types of switches, a keyboard, a mouse, a microphone or the like, and an output unit 207 constituted by a display, a speaker or the like. The CPU 201 executes various types of processes in response to a command input from the input unit 206, and outputs a processing result to the output unit 207, for example.

The storage unit 208 connected with the input/output interface 205 is constituted by a hard disk or the like, and stores programs executed by the CPU 201 and various types of data. A communication unit 209 functions as a transmitting and receiving unit for data communication via various types of communication networks, and communicates with an external device.

A drive 210 connected with the input/output interface 205 drives a removable medium 211 such as a magnetic disk, an optical disk, a magneto-optical disk, and a semiconductor memory including a memory card to record and read data.

[6. Summary of Present Disclosure]

The embodiment according to the present disclosure has been described in detail with reference to the particular examples. It is obvious, however, that modifications and substitutes for the embodiment may be made by those skilled in the art without departing from the subject matters of the present disclosure. Accordingly, the disclosure of the present invention has been presented not for the purpose of limiting the scope of the present technology, but presented only by way of example. The subject matters of the present disclosure should be defined in consideration of the appended claims.

A technology disclosed in the present specification may have the following configurations.

(1) A communication device including:

a data processing unit that generates, or acquires from a storage unit, metadata recording transmission frequency information in units of component that is constituent data of a broadcast delivery service and corresponds to a data element allowed for independent delivery to a user terminal; and a communication unit that transmits the metadata to the user terminal.

(2) The communication device according to (1) described above, wherein the component is a data element contained in one broadcast delivery service and allowed for independent delivery, and the metadata is a structure that records transmission frequency information corresponding to each of all components contained in one broadcast delivery service.

(3) The communication device according to (1) or (2) described above, wherein the data processing unit transmits metadata that records access information in units of component, and transmission area information in units of component, in addition to the transmission frequency information in units of component, to the user terminal via the communication unit.

(4) The communication device according to any one of (1) through (3) described above, wherein the data processing unit performs communication control for transmitting, at a different transmission frequency, a component that is a data element contained in one broadcast delivery service and allowed for independent delivery, and the metadata records the different transmission frequency as component transmission frequency information.

(5) The communication device according to any one of (1) through (4) described above, including a storage unit that stores the metadata, wherein the data processing unit reads the metadata from the storage unit, and transmits the metadata to the user terminal via the communication unit in response to a request from the user terminal.

(6) The communication device according to any one of (1) through (5) described above, wherein the data processing unit performs communication control for transmitting a particular component only to a particular area at a transmission frequency corresponding to the component via a base station selected in units of component.

(7) The communication device according to any one of (1) through (6) described above, wherein the data processing unit executes a broadcast delivery service of content including at least any one of image data, audio data, and subtitle data, and the component is any one of image data, audio data in a particular language, and subtitle data in a particular language, each type of the data corresponding to a data element constituting the broadcast delivery service of the content.

(8) The communication device according to any one of (1) through (7) described above, wherein the component includes different sets of encoded image data for realizing image reproduction of different resolutions.

(9) A communication device including:

a communication unit that receives, from a data transmission device, metadata recording transmission frequency information in units of component that is constituent data of a broadcast delivery service and constitutes a data element allowed for independent delivery to a user terminal; and a data processing unit that executes a process using the metadata.

(10) The communication device according to (9) described above, wherein the data processing unit executes setting of a reception frequency allowing reception of a component based on transmission frequency information recorded in the metadata in units of component.

(11) The communication device according to (9) or (10) described above, wherein the component is a data element contained in one broadcast delivery service and allowed for independent delivery, and the metadata is a structure that records transmission frequency information corresponding to each of all components contained in one broadcast delivery service.

(12) The communication device according to any one of (9) through (11) described above, wherein the communication unit receives metadata that records access information in units of component, and transmission area information in units of component, in addition to the transmission frequency information in units of component, from the data transmission device.

(13) The communication device according to any one of (9) through (12) described above, wherein the data processing unit executes setting of reception frequencies allowing reception of a plurality of components based on different sets of transmission frequency information recorded in the metadata and indicating transmission frequencies of the plurality of components, and performs communication control for receiving, at a different transmission frequency, a component that is a data element contained in one broadcast delivery service and allowed for independent delivery.

(14) The communication device according to any one of (9) through (13) described above, wherein the communication unit executes a reception process for receiving a component transmitted at a transmission frequency corresponding to the component via a base station selected in units of component.

(15) The communication device according to any one of (9) through (14) described above, wherein the component is any one of image data, audio data in a particular language, and subtitle data in a particular language, each type of the data corresponding to a data element constituting a broadcast delivery service of content.

(16) The communication device according to any one of (9) through (15) described above, wherein the component includes different sets of encoded image data for realizing image reproduction of different resolutions.

(17) A communication control data transmitting method performed by a data transmission device, the method including:

by a data processing unit, generating, or acquiring from a storage unit, metadata recording transmission frequency information in units of component that is constituent data of a broadcast delivery service and corresponds to a data element allowed for independent delivery to a user terminal; and by a communication unit, transmitting the metadata to the user terminal.

(18) A communication control data receiving method performed by a data reception device, the method including:

by a communication unit, receiving, from a data transmission device, metadata recording transmission frequency information in units of component that is constituent data of a broadcast delivery service and corresponds to a data element allowed for independent delivery to a user terminal; and by a data processing unit, executing a process using the metadata.

A series of processes described in the specification may be executed by hardware, software, or a complex configuration of hardware and software. For executing the processes by software, a program recording a processing sequence may be installed in a memory incorporated in dedicated hardware within a computer, or may be installed in a general-purpose computer capable of executing various types of processes. For example, the program may be recorded in a recording medium beforehand. The program may be installed into a computer from the recording medium, or received via a network, such as a Local Area Network (LAN) and the Internet, and installed in a recording medium such as a built-in hard disk.

The respective processes described in the specification are not only to be executed in time series described in the specification, but may be executed in parallel or individually in accordance with the processing capacity of the devices used for executing the processes, or as necessary. The system in the present specification refers to a logical collective configuration constituted by a plurality of devices, and includes a set of constituent devices not contained in an identical housing.

INDUSTRIAL APPLICABILITY

As described above, according to a structure of an embodiment of the present disclosure, transmission frequency information in units of component, the component being a data element contained in one broadcast delivery service, is supplied to a user terminal. In this case, the user terminal is capable of executing reception setting corresponding to a component. Accordingly, a structure capable of securely receiving each component is realizable.

More specifically, a data transmission device transmits metadata to the user terminal, which metadata records transmission frequency information in units of component that is constituent data of a broadcast delivery service and corresponds to a data element allowed for independent delivery to the user terminal, such as units of component constituted by image data having a particular resolution, audio data or subtitle data in a particular language, or other types of data. The user terminal corresponding to a receiving device executes a setting process for setting a reception frequency allowing reception of a component intended to be received based on transmission frequency information recorded in units of component in the metadata received from the data transmission device.

According to this structure, transmission frequency information in units of component, the component being a data element contained in one broadcast delivery service, is supplied to the user terminal. In this case, the user terminal is capable of executing reception setting corresponding to a component. Accordingly, a structure capable of securely receiving each component is realizable.

REFERENCE SIGNS LIST

10 Communication system
11 Content provider
12 Data transmission device
13 Base station
20 User terminal
51 Data processing unit
52 Communication unit
53 Storage unit
71 Data processing unit
72 Communication unit
73 Storage unit
74 Input/output unit
111 Application layer
112 RRC/MBMS layer
113 RLC layer
114 MAC layer
115 PHY layer
121 Application layer
122 RRC/MBMS layer
123 RLC layer
124 MAC layer
125 PHY layer
201 CPU
202 ROM
203 RAM
204 Bus
205 Input/output interface
206 Input unit
207 Output unit
208 Storage unit
209 Communication unit
210 Drive
211 Removable medium

The invention claimed is:

1. A communication device comprising:
   data processing circuitry configured to generate, or acquire from a storage, metadata that records, independently for first and second components of a service, (i) first and second delivery mode information including transmission frequency information indicating a frequency band for transmitting a respective one of the first and second components, (ii) access information, and (iii) transmission area information indicating a delivery area of the respective one of the first and second components, wherein for each of the first and second components, the metadata corresponds to a data element constituting image data, audio data, or subtitle data, wherein the first component is different from the second component, and the first delivery mode information is different from the second delivery mode information; and
   communication circuitry that transmits the metadata to the user terminal for receiving the first and second components of the service.

2. The communication device according to claim 1, wherein
   the respective one of the first and second components is a data element contained in one service and allowed for independent delivery, and
   the metadata is a structure that records transmission frequency information corresponding to each of all components contained in one service.

3. The communication device according to claim 1, wherein
   the data processing circuitry is configured to perform communication control for transmitting, at a different transmission frequency, the respective one of the first and second components that is a data element contained in one service and allowed for independent delivery, and
   the metadata records the different transmission frequency as component transmission frequency information.

4. The communication device according to claim 1, comprising a storage that stores the metadata, wherein the data processing circuitry is configured to read the metadata from the storage, and transmit the metadata to the user terminal via the communication circuitry in response to a request from the user terminal.

5. The communication device according to claim 1, wherein the data processing circuitry is configured to perform communication control for transmitting the respective one of the first and second components only to a particular area at a transmission frequency corresponding to the respective one of the first and second components via a base station selected in units of the respective one of the first and second components.

6. The communication device according to claim 1, wherein
   the data processing circuitry is configured to execute a service of content including at least any one of image data, audio data, and subtitle data, and
   the respective one of the first and second components is any one of image data, audio data in a particular language, and subtitle data in a particular language, each type of the data corresponding to a data element constituting the service of the content.

7. The communication device according to claim 1, wherein the respective one of the first and second components includes different sets of encoded image data for realizing image reproduction of different resolutions.

8. A communication device comprising:
   a receiver circuitry configured to receive metadata that records, independently for first and second components of a service, (i) first and second delivery mode information including transmission frequency information indicating a frequency band for transmitting a respective one of the first and second components, (ii) access information, and (iii) transmission area information including a delivery area of the respective one of the first and second components, wherein for each of the first and second components, the metadata corresponds to a data element constituting image data, audio data, or subtitle data, wherein the first component is different from the second component, and the first delivery mode information is different from the second delivery mode information; and a data processing circuitry configured to execute a process using the metadata for receiving the first and second components of the service.

9. The communication device according to claim 8, wherein the data processing circuitry is configured to execute setting of a reception frequency allowing reception of the respective one of the first and second components based on transmission frequency information recorded in the metadata in units of the respective one of the first and second components.

10. The communication device according to claim 8, wherein
the respective one of the first and second components is a data element contained in one service and allowed for independent delivery, and
the metadata is a structure that records transmission frequency information corresponding to each of all components contained in one service.

11. The communication device according to claim 8, wherein the communication circuitry is configured to receive metadata that records access information in units of the respective one of the first and second components, and transmission area information in units of the respective one of the first and second components, in addition to the transmission frequency information in units of the respective one of the first and second components, from a data transmission device.

12. The communication device according to claim 8, wherein the data processing circuitry is configured to execute setting of reception frequencies allowing reception of a plurality of components based on different sets of transmission frequency information recorded in the metadata and indicating transmission frequencies of the plurality of components, and perform communication control for receiving, at a different transmission frequency, a component from the plurality of components that is a data element contained in one service and allowed for independent delivery.

13. The communication device according to claim 8, wherein the communication circuitry is configured to execute a reception process for receiving a component transmitted at a transmission frequency corresponding to the respective one of the first and second components via a base station selected in units of the respective one of the first and second components.

14. The communication device according to claim 8, wherein the respective one of the first and second components is any one of image data, audio data in a particular language, and subtitle data in a particular language, each type of the data corresponding to a data element constituting a service of content.

15. The communication device according to claim 8, wherein the respective one of the first and second components includes different sets of encoded image data for realizing image reproduction of different resolutions.

16. A communication control data transmitting method performed by a data transmission device, the method comprising:
using data processing circuitry, generating, or acquiring from a storage, metadata that records, independently for first and second components of a service, (i) first and second delivery mode information including transmission frequency information indicating a frequency band for transmitting a respective one of the first and second components, (ii) access information, and (iii) transmission area information indicating a delivery area of the respective one of the first and second components, wherein for each of the first and second components, the metadata corresponds to a data element constituting image data, audio data, or subtitle data, wherein the first component is different from the second component, and the first delivery mode information is different from second delivery mode information; and
using communication circuitry, transmitting the metadata to the user terminal for receiving the first and second components of the service.

17. A communication control data receiving method performed by a data reception device, the method comprising:
using communication circuitry, receiving metadata that records, independently for first and second components of a service, (i) first and second delivery mode information including transmission frequency information indicating a frequency band for transmitting a respective one of the first and second components, (ii) access information, and transmission area information indicating a delivery area of the respective one of the first and second components, wherein for each of the first and second components, the metadata corresponds to a data element constituting image data, audio data, or subtitle data, wherein the first component is different from the second component, and the first delivery mode information is different from second delivery mode information; and
using data processing circuitry, executing a process using the metadata for receiving the first and second components of the service.

* * * * *